United States Patent
Aieta et al.

(10) Patent No.: US 12,025,812 B2
(45) Date of Patent: Jul. 2, 2024

(54) METASURFACE OPTICAL COMPONENTS FOR ALTERING INCIDENT LIGHT

(71) Applicant: President and Fellows of Harvard College, Cambridge, MA (US)

(72) Inventors: Francesco Aieta, Sunnyvale, CA (US); Mikhail Kats, Madison, WI (US); Patrice Genevet, Valbonne (FR); Federico Capasso, Cambridge, MA (US); Mohammadreza Khorasaninejad, Belmont, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 18/220,764

(22) Filed: Jul. 11, 2023

(65) Prior Publication Data
US 2024/0118554 A1    Apr. 11, 2024

Related U.S. Application Data

(63) Continuation of application No. 17/029,157, filed on Sep. 23, 2020, now Pat. No. 11,733,535, which is a
(Continued)

(51) Int. Cl.
*G02B 27/42* (2006.01)
*G02B 1/00* (2006.01)
(Continued)

(52) U.S. Cl.
CPC .......... *G02B 27/4211* (2013.01); *G02B 1/002* (2013.01); *G02B 5/008* (2013.01);
(Continued)

(58) Field of Classification Search
None
See application file for complete search history.

(56) References Cited

U.S. PATENT DOCUMENTS

| 3,877,034 A | 5/1975 | Nelson |
| 4,777,116 A | 10/1988 | Kawatsuki et al. |

(Continued)

FOREIGN PATENT DOCUMENTS

| CN | 101158727 A | 11/2007 |
| CN | 204422813 U | 6/2015 |

(Continued)

OTHER PUBLICATIONS

Genevet, et al., "Breakthroughs in Photonics 2013: Flat Optics: Wavefronts Control with Huygens' Interfaces," IEE Photonics Journal, vol. 6, No. 2, pp. 1-4, Apr. 1, 2014.
(Continued)

*Primary Examiner* — Christopher Stanford
*Assistant Examiner* — Journey F Sumlar
(74) *Attorney, Agent, or Firm* — Modern Times Legal; Robert J. Sayre

(57) ABSTRACT

Multi-wavelength light is directed to an optic including a substrate and metasurface optical components deposited on a surface of the substrate. The metasurface optical components comprise a pattern of silicon dielectric resonators with nonperiodic gap distances between adjacent dielectric resonators. Incident light directed to the metasurface optical components is scattered and phase-shifted by the configuration of the gap distances and the widths and thicknesses of the dielectric resonators. Each dielectric resonator has a rectangular cross-section such that a first phase shift is imparted for a transverse-electric (TE) component of the incident light and a second phase shift is imparted for a transverse-magnetic (TM) component of the incident light.

24 Claims, 12 Drawing Sheets

Related U.S. Application Data continuation of application No. 15/534,642, filed as application No. PCT/US2015/064930 on Dec. 10, 2015, now Pat. No. 10,816,815.

(60) Provisional application No. 62/090,172, filed on Dec. 10, 2014.

(51) Int. Cl.
   *G02B 5/00*   (2006.01)
   *G02B 5/20*   (2006.01)
   *H01Q 15/10*  (2006.01)
   *G02B 5/18*   (2006.01)

(52) U.S. Cl.
   CPC .............. *G02B 5/203* (2013.01); *H01Q 15/10* (2013.01); *G02B 5/1809* (2013.01)

(56) References Cited

U.S. PATENT DOCUMENTS

| | | |
|---|---|---|
| 5,085,496 A | 2/1992 | Yoshida et al. |
| 5,337,146 A | 8/1994 | Azzam |
| 5,452,126 A | 9/1995 | Johnson |
| 5,620,792 A | 4/1997 | Challener, IV |
| 8,169,703 B1 | 5/2012 | Mossberg et al. |
| 8,681,428 B1 | 3/2014 | Brown |
| 9,151,891 B2 | 10/2015 | Ma et al. |
| 10,816,815 B2 | 10/2020 | Aieta et al. |
| 2002/0181126 A1 | 12/2002 | Nishioka |
| 2004/0190116 A1 | 9/2004 | Lezec et al. |
| 2005/0161589 A1 | 7/2005 | Kim et al. |
| 2005/0211665 A1 | 9/2005 | Gao et al. |
| 2010/0110430 A1 | 5/2010 | Ebbesen et al. |
| 2010/0226134 A1 | 9/2010 | Capasso et al. |
| 2011/0012807 A1 | 1/2011 | Sorvala |
| 2012/0262787 A1 | 10/2012 | Zeitner |
| 2012/0327666 A1 | 12/2012 | Liu et al. |
| 2013/0016030 A1 | 1/2013 | Liu et al. |
| 2013/0208332 A1 | 8/2013 | Yu et al. |
| 2014/0028899 A1 | 1/2014 | Shen et al. |
| 2014/0043846 A1 | 2/2014 | Yang et al. |
| 2014/0347733 A1 | 11/2014 | Stewart et al. |
| 2015/0090862 A1 | 4/2015 | Matsui et al. |
| 2015/0092139 A1 | 4/2015 | Eguchi |
| 2015/0098002 A1 | 4/2015 | Wang |
| 2015/0116721 A1 | 4/2015 | Kats et al. |
| 2015/0219806 A1 | 8/2015 | Arbabi et al. |
| 2015/0241608 A1 | 8/2015 | Shian et al. |

FOREIGN PATENT DOCUMENTS

| | | |
|---|---|---|
| EP | 2763519 A2 | 8/2014 |
| JP | 2005274847 A | 10/2005 |
| WO | 2011106553 A2 | 9/2011 |
| WO | 2013/033591 A1 | 3/2013 |

OTHER PUBLICATIONS

Cade, "These Tiny, Incredible 'Metalenses' are the Next Giant Leap in Optics," Nature Communications, Nov. 12, 2014, vol. 5, No. 5386, pp. 1-6, doi: 10.1038/ncomms6386.

Arbabi ,et al., "Dielectric Metasurfaces for Complete Control of Phase and Polarization with Subwavelength Spatial Resolution and High Transmission," (SPIE Press, 2011), pp. 89-111.

Chen, et al., "Dual-polarity plasmonic metalens for visible light," Optics Express, Apr. 12, 2010, vol. 18, No. 8, pp. 9815-9530.

Chen, et al., "Phase and dispersion engineering of metalenses: broadband achromatic focusing and imaging in the visible," Journal of Optics, Institute of Physics Publishing, 2014, vol. 16, Issue 12, 14 pgs., doi:10.1088/2040489781/16/12/123001.

Ding, et al., "Gradient Metasurfaces: Fundamentals and Applications," Nano Lett. 2013, 13, 1086-1091, x.doi.org/10.1021/nl304392b.

Dong, et al., "Zero-index photonic crystal as low-aberration optical lens" (Conference Presentation) (Abstract), Nature Communications, vol. 3, Article 870, May 29, 2012, pp. 1-7.

Khorasaninejad, et al., "Achromatic Metalens over 60 nm Bandwidth in the Visible and Metalens with Reverse Chromatic Dispersion," Nature Communications, Nov. 13, 2012, vol. 3, No. 1198, pp. 1-6, DOI 10.10388/ncomms2207.

Liu, et al., "Realization of polarization evolution on higher-order Poincare sphere with metasurface," 104 Applied Physics Letters 191110 (May 15, 2014).

Zhao, et al., "Tailoring the Dispersion of Plasmonic Nanorods to Realize Broadband Optical Meta-Waveplates," Applied Physics Letters, 2014, vol. 104, pp. 191110-1-191101-4, http://dx.doi.org/10.1063/1.4878409.

C. Jin, et al., "Waveforms for optimal sub-keV high-order harmonics with synthesized two- or three-colour laser fields," 5 Nature Communications 4003 (May 30, 2014).

C. Saeidi, et al., "Wideband plasmonic focusing metasurfaces," 105 Applied Physics Letters 053107 (Aug. 6, 2014).

F. Aieta, et al., "Aberration-Free Ultrathin Flat Lenses and Axicons at Telecom Wavelengths Based on Plasmonic Metasurfaces," 12 Nano Letters 4932-36 (Aug. 15, 2012).

F. Aieta, et al., "Out-of-Plane Reflection and Refraction of Light by Anisotropic Optical Antenna Metasurfaces with Phase Discontinuities," 12 Nano Letters 1702-06 (Feb. 15, 2012).

N. Yu, et al., "Flat Optics: Controlling Wavefronts with Optical Antenna Metasurfaces," 19 IEEE Journal of Selected Topics in Quantum Electronics 4700423 (Apr. 25, 2013).

N. Yu, et al., "Flat optics with designer metasurfaces," 13 Nature Materials 139-150 (Jan. 23, 2014).

N. Yu, et al., "Light Propagation with Phase Discontinuities: Generalized Laws of Reflection and Refraction," 334 Science 333-37 (Oct. 21, 2011).

D. Fattal, "Flat Dielectric Grating Reflectors with Focusing Abilities," 4 Nature Photonics 466-470 (May 2, 2010).

METASURFACE OPTICAL COMPONENTS FOR ALTERING INCIDENT LIGHT

RELATED APPLICATIONS

This application is a continuation of Ser. No. 17/029,157, filed 23 Sep. 2020, which is a continuation of U.S. application Ser. No. 15/534,642 (now US Pat. No. 10,816,815 B2), which was the national-phase entry of International Application No. PCT/US2015/064930, filed 10 Dec. 2015, the entire contents of each of which are incorporated herein by reference.

This application also claims the benefit of U.S. Provisional Application No. 62/090,172, filed 10 Dec. 2014, the entire content of which is incorporated herein by reference.

GOVERNMENT SUPPORT

This invention was made with government support under Grant No. FA9550-12-1-0289 awarded by the Air Force Office of Scientific Research. The Government has certain rights in the invention.

BACKGROUND

Refractive and diffractive optical components share many similarities when they are used with monochromatic light. If we illuminate a prism and a grating with a laser beam, they will both bend the incoming light. In a similar fashion, a spherical lens and a diffractive lens (zone plate) both focus light. However, the behavior of refractive optics and diffractive optics is very different when they are used to manipulate broadband light. A prism with normal dispersion will deflect the longer wavelengths to a smaller angle compared to the shorter wavelengths; a diffraction grating, instead, does the opposite. Likewise, the focal distance for a refractive lens in the visible wavelengths will be larger for red light than for blue, while the contrary occurs for a diffractive lens.

This contrasting behavior arises because two different principles are used to shape the light. Wavefront control in refractive optics is obtained by gradual phase accumulation as the light propagates through a material of a given refractive index, $n=n(\lambda)$, on account of material dispersion. In most transparent materials, the refractive index decreases with increasing wavelength ("normal dispersion") over the visible region. Since the deflection angle, $\theta$, of a prism increases with the index, $n(\lambda)$ while a lens focal length, f, is inversely proportional to $n(\lambda)$, the resulting effect of refractive optics 11 is the one shown in images A and B of FIG. 1.

A diffractive optical element (DOE) 13, instead, operates by means of interference of light transmitted through an amplitude or phase mask. The beam deflection angle and the focal length, respectively, are directly and inversely proportional to $\lambda$ (images C and D of FIG. 1), generating a dispersion opposite to that of standard refractive devices. Although for many applications a spatial separation of different wavelengths is desirable (spectrometers, monochromators, wavelength division multiplexing (WDM)), in many others this spatial separation represents a problem. For example, the dependence of the focal distance on $\lambda$ produces chromatic aberrations and is responsible for the degradation of the quality of an imaging system. We note that the wavelength dependence is typically much more pronounced in diffractive optics than in refractive optics. Materials used to make high-quality refractive optics can have very low dispersion; and in some cases, materials with opposite dispersion are used to cancel out the effect (e.g., achromatic doublets).

Another difference between these technologies is represented by the efficiency with which a desired function is achieved. In refractive optics, the efficiency can be very high and is limited only by material losses, fabrication imperfections, and interface reflections. In diffractive optics, instead, the presence of higher diffraction orders imposes severe limitations on performance. On the other hand, diffractive optical elements have the advantage of being relatively flat, light and often low cost. Blazed gratings and Fresnel lenses are diffractive optical devices with an analog phase profile, and thus they are simultaneously refractive and diffractive. As such, they integrate some benefits of both technologies (e.g., small footprint and high efficiency); but they still suffer from strong chromatic aberrations. Multi-order diffractive (MOD) lenses overcome this limitation by using thicker phase profiles optimized such that the phase difference corresponds to an integer number of $2\pi$ for each wavelength. With this approach, one can in principle obtain a set of wavelengths that are chromatically corrected (1). The realization of thick, analog phase profiles, however, is challenging for conventional technologies, such as greyscale lithography or diamond turning.

Metasurfaces are thin optical components that rely on a different approach for light control; a dense arrangement of subwavelength resonators is designed to modify the optical response of the interface. As shown previously [N. Yu, et al., "Light Propagation with Phase Discontinuities: Generalized Laws of Reflection and Refraction," 334 *Science* 333-37 (2011), and PCT Patent Application Publication No. WO 2013/033591 A1], the resonant nature of the scatterers introduces a local abrupt phase shift in the incident wavefront making it possible to mold the scattered light at will and enabling a new class of planar photonics components (i.e., flat optics) [see N. Yu, et al., "Flat optics: Controlling wavefronts with optical antenna metasurfaces," *IEEE J. Sel. Top. Quantum Electron.* 19(3), 4700423 (2013), and N. Yu, F. Capasso, "Flat optics with designer metasurfaces," 13 *Nat. Materials* 139-150 (2014). Different types of resonators (metallic or dielectric antennas, apertures in metallic films, etc.) have been used to demonstrate various flat optical devices, including blazed gratings, lenses, holograms, polarizers, and wave plates. The metasurface approach is unique in that it provides continuous control of the phase profile (i.e., from 0 to 2a) with a binary structure (only two levels of thickness). Metasurfaces also circumvent the fundamental limitation of multiple diffraction orders typical of binary diffractive optics while simultaneously maintaining the size, weight, and ease-of-fabrication advantages compared to refractive optics.

Metasurface-based optical devices demonstrated so far, however, are affected by large chromatic aberrations (i.e., strong wavelength-dependence). Research efforts have recently shown that relatively "broadband" optical metasurfaces can be achieved. The claim of large bandwidth usually refers to the broadband response of the resonators, which is the result of the high radiation losses necessary for high scattering efficiency and, to a lesser extent, of the absorption losses. As a consequence, the phase function implemented by the metasurface can be relatively constant over a range of wavelengths. This constant phase function, however, is not sufficient to obtain an achromatic behavior.

SUMMARY

Metasurface optical devices and methods for dispersive phase compensation using metasurface optical components are described herein, where various embodiments of the apparatus and methods for their fabrication and use may include some or all of the elements, features and steps described below.

An embodiment of a metasurface optical device includes a substrate including a surface and a pattern of dielectric resonators on the surface of the substrate, wherein the dielectric resonators have nonperiodic gap distances between adjacent dielectric resonators; and each silicon dielectric resonator has a width, a length, and a thickness. The gap distances, the widths, and the thicknesses are configured to scatter incident light and impart a phase shift, ranging at least from 0 to $2\pi$, on an outgoing light, and each dielectric resonator has a rectangular cross-section in a plane perpendicular to the substrate surface such that a first phase shift is imparted for a transverse-electric (TE) component of the incident light and a second phase shift is imparted for a transverse-magnetic (TM) component of the incident light.

The widths and the gaps of the dielectric resonators can be configured to deflect a plurality of wavelengths of interest to or from a focal point at a shared focal length. In other embodiments, the widths and the gaps of the dielectric resonators can be configured to deflect a plurality of wavelengths of interest at a shared angle. In additional embodiments, the widths and gaps of the dielectric resonators can be configured to form a same complex wave-front (such as a vortex beam or a Bessel beam for a plurality of wavelengths of interest).

In a method for dispersive phase compensation using achromatic metasurface optical components, multi-wavelength light is directed to an optic including a substrate and achromatic metasurface optical components deposited on a surface of the substrate, wherein the achromatic metasurface optical components comprise a pattern of dielectric resonators, the dielectric resonators having nonperiodic gap distances between adjacent dielectric resonators and each silicon dielectric resonator has a width, a length, and a thickness. The gap distances, the widths, and the thicknesses are configured to scatter incident light and impart a phase shift, ranging at least from 0 to $2\pi$, on an outgoing light, and each dielectric resonator has a rectangular cross-section in a plane perpendicular to the substrate surface such that a first phase shift is imparted for a transverse-electric (TE) component of the incident light and a second phase shift is imparted for a transverse-magnetic (TM) component of the incident light.

A plurality of wavelengths of interest selected from the wavelengths of the multi-wavelength light can be deflected with the dielectric resonators at a shared angle or to or from a focal point at a shared focal length.

The wavelengths of interest can span a range of more than 100 nm.

In particular embodiments, the substrate comprises silica. In additional embodiments, the dielectric resonators comprise silicon.

Each of the dielectric resonators can have a width and thickness that are smaller than the wavelengths of light. Widths of different dielectric resonators can differ by at least 25 nm. Additionally, each of the dielectric resonators can have a width of at least 100 nm.

The dielectric resonators can have multiple electric and magnetic resonances that overlap at the wavelengths of interest.

In particular embodiments, the surface of the substrate on which the achromatic metasurface optical components are deposited and a surface on an opposite side of the substrate are both flat.

In additional embodiments, light at wavelengths other than the wavelengths of interest (a) is not deflected or (b) is deflected at angles other than the shared angle or is deflected at angles other than to/from the focal point at the shared focal length.

In still further embodiments, a majority of the light at wavelengths other than the wavelengths of interest is removed by the optic to provide multiband optical filtering of the light.

The replacement of bulk refractive elements with flat ones enables the miniaturization of optical components required for integrated optical systems. This process comes with the limitation that planar optics suffer from large chromatic aberrations due to the dispersion of the phase accumulated by light (in the visible or non-visible spectrum) during propagation. We show that this limitation can be overcome by compensating the dispersion of the propagation phase with the wavelength-dependent phase shift imparted by a metasurface. We demonstrate dispersion-free, multi-wavelength dielectric metasurface deflectors in the near-infrared and design an achromatic flat lens in the same spectral region. This design is based on low-loss coupled dielectric resonators that introduce a dense spectrum of modes to enable dispersive phase compensation. Achromatic metasurfaces can be used in applications, such as multi-band-pass filters, lightweight collimators, and chromatically-corrected imaging lenses.

BRIEF DESCRIPTION OF THE DRAWINGS

In the accompanying drawings, like reference characters refer to the same or similar parts throughout the different views. The drawings are not necessarily to scale; instead, emphasis is placed upon illustrating particular principles in the exemplifications discussed below.

DETAILED DESCRIPTION

Figure 1A:
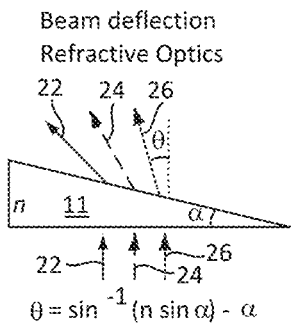
FIGS. 1A-F include a series of images providing a comparison between refractive optics 11 (assuming a material with normal dispersion) in FIGS. 1A and 1B, diffractive optics 13 (FIGS. 1C and 1D), and achromatic metasurfaces 15 (FIGS. 1E and 1F), where the deflection or focusing of different wavelengths of light 22, 24, and 26 are shown in each image. In the first two cases (FIGS. 1A-D), the angle of deflection, θ, and the focal length, f, change as a function of wavelength. The achromatic metasurface (FIGS. 1E and 1F), consisting of subwavelength spaced resonators, is designed to preserve its operation (i.e., same θ and f) for multiple wavelengths. In order to achieve this result, the phase shifts, $\varphi_{m,i}$ and $\varphi_{m,j}$, imparted by the metasurface at points, $r_i$ and $r_j$ of the interface, are designed so that the paths, $l_i=l(r_i)$ and $l_j=l(r_j)$ are optically equivalent at different wavelengths.
Figure 1C:
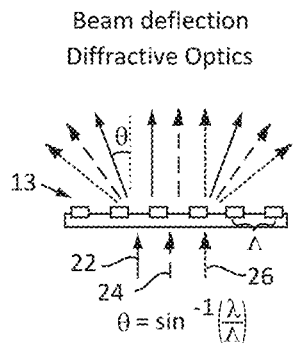

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Figure 1E:
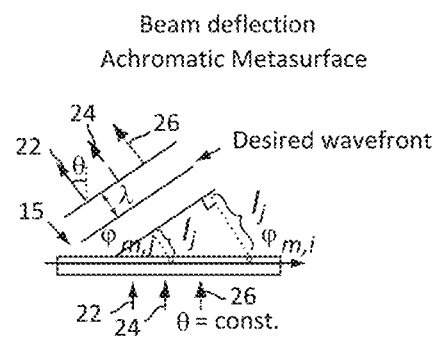
Figure 1B:
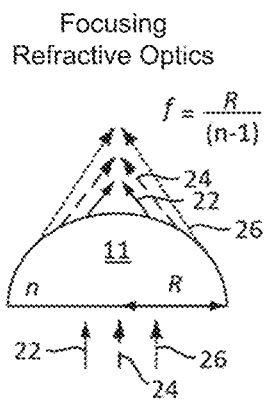
Figure 1D:
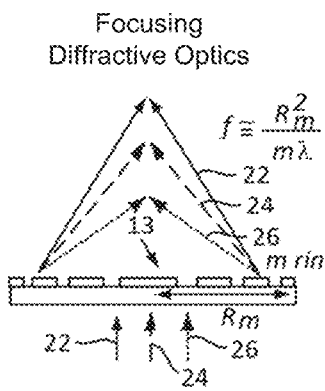
Figure 1F:
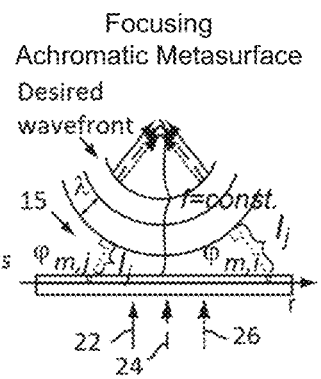

Dispersive phase compensation A desired optical functionality (e.g., focusing, beaming, etc.) requires constructive interference between multiple light paths separating the interface and the desired wavefront (i.e., the same total accumulated phase, $\varphi_{tot}$, modulo 2a for all light paths, as shown in the images of FIGS. 1E and 1F). The total accumulated phase is the sum of the following two contributions: $\varphi_{tot}(r, \lambda) = \varphi_m(r, \lambda) + \varphi_p(r, \lambda)$, where $\varphi_m$ is the phase imparted at point, r, by the metasurface 15, where $\varphi_p$ is the phase accumulated via propagation through free space, and where A is the wavelength of light. The first term is related to the scattering of the individual metasurface elements and is characterized by a significant variation across the resonance. The second term is given by $$\varphi_p(r, \lambda) = \frac{2\pi}{\lambda} l(r, \lambda),$$

where l(r) is the physical distance between the interface at position, r, and the desired wavefront (as shown in the images of FIGS. 1E and 1F). To ensure achromatic behavior of the device (e.g., with deflection angle or focal length independent of wavelength), the condition of constructive interference should be preserved at different wavelengths by keeping $\varphi_{tot}$ constant. The dispersion of $\varphi_m$ is designed to compensate for the wavelength-dependence of $\varphi_p$ via the following equation:

$$\varphi_m(r, \lambda) = -\frac{2\pi}{\lambda} l(r), \tag{1}$$

where l(r) contains information on the device function {i.e., beam deflector [N. Yu, et al., "Flat optics: Controlling wavefronts with optical antenna metasurfaces," IEEE J. Sel. Top. Quantum Electron. 19(3), 4700423 (May 2013) and F. Aieta, et al., "Out-of-plane reflection and refraction of light by anisotropic optical antenna metasurfaces with phase discontinuities," 12 Nano Lett. 1702-1706 (27 Feb. 2012)], lens, axicon [F. Aieta, "Aberration-free ultrathin flat lenses and axicons at telecom wavelengths based on plasmonic metasurfaces," 12 Nano Lett. 4932-36 (21 Aug. 2012)], etc.}. Equation 1 is the cornerstone for the design of an achromatic metasurface 15. This approach to flat optics features the advantages of diffractive optics 13, such as flatness and small footprint, while achieving achromatic operation. As an example of an achromatic metasurface 15, we demonstrate a dispersion-free beam deflector based on dielectric resonators 18. While the typical function of a diffractive grating is the angular separation of different wavelengths, we show beam deflection with a wavelength-independent angle of deflection, θ, for a discrete set of wavelengths ($\lambda_1$=1300 nm, $\lambda_2$=1550 nm, and $\lambda_3$=1800 nm).

The basic unit of the achromatic metasurface 15 is a resonator 18 that can be designed to adjust the scattered phase at different wavelengths, $\varphi_m(r, \lambda)$, in order to satisfy Equation 1. In particular embodiments, the resonators 18 are dielectric antennas (i.e., resonant elements that interact with electromagnetic waves via a displacement current and that can have both electric and magnetic resonances). Primarily used in the microwave frequency range, dielectric antennas have recently been proposed in the optical regime as an alternative to metallic antennas because of their low losses at shorter wavelengths. Nanostructures made of a material with a large refractive index exhibit resonances while remaining small compared to the wavelength of light in free-space, similar to what occurs in plasmonic antennas.

Design of Dielectric Achromatic Metasurfaces

Figure 2A:
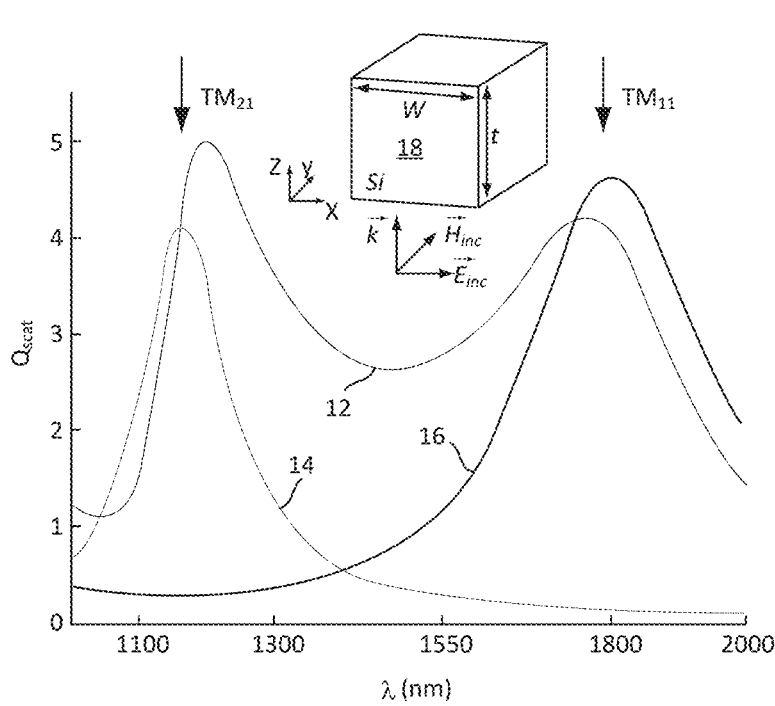
FIGS. 2A-C illustrate the scattering properties of an isolated silicon rectangular dielectric resonator 18 with dimensions, w=t=350 nm (with infinite length along the y-axis), excited by a plane wave traveling at normal incidence along the z-axis. The chart shown in FIG. 2A plots the scattering efficiency, $Q_{scat}$, which is defined as the ratio of the two-dimensional scattering cross-section, which has the dimension of a length, and the geometric length, w, for transverse-magnetic (TM) excitation 12, electric dipole excitation 14 and magnetic dipole excitation 16. The grey arrows indicate the resonant frequencies calculated with the analytical model for the first two modes ($TM_{11}$ and $TM_{21}$). The images of FIGS. 2B and 2C show the electric field intensity distribution at the two resonant frequencies obtained with plane wave excitation. The white lines give a schematic representation of the instantaneous electric field lines around the resonator.

To design an achromatic metasurface 15, the scattering properties of a rectangular dielectric resonator (RDR), which is a resonator 18 with rectangular cross-section in the x-z plane and infinite extent along the y axis, were studied, as shown in FIG. 2A. Despite the simple geometry, an analytical closed-form for the electromagnetic fields does not exist for rectangular dielectric resonators; therefore, designs described herein are optimized using finite-difference time-domain (FDTD) simulations.

However, in order to estimate the spectral position of the resonant modes, an approximated solution based on the dielectric waveguide model is derived. The model predicts the existence of a transverse magnetic (TM$_{mn}$) mode 12 and a transverse electric (TE$_{mn}$) mode inside the resonator. TM modes 12 are excited by an electric field with a polarization parallel to the side, w, of the rectangular dielectric resonator, while TE modes are activated by an excitation polarized along the y-axis. The subscripts, m and n, denote the number of field extrema in the x- and z-directions. The derivation of the model and a detailed comparison with FDTD simulations are reported in the Exemplification section, below.

The plot A of FIG. 2A shows scattering efficiencies calculated from FDTD simulations for an isolated silicon rectangular dielectric resonator in vacuum with geometry, w=t=350 nm, and excited with TM-polarized light (black line). Analogous to the scattering of dielectric spheres rigorously described by Mie theory, the first two peaks correspond to the electric and magnetic dipole resonances of the electric dipole excitation 14 and the magnetic dipole excitation 16, respectively. This correspondence is confirmed by showing the scattering spectra of the same rectangular dielectric resonator independently excited with an electric and a magnetic dipole placed at the center of the resonator and oriented along the x and y axis, respectively. The grey arrows indicate the resonant frequencies calculated with the analytical model for the first two modes (TM$_{11}$ and TM$_{21}$). The electric field intensity distributions at the two resonances (the images of FIGS. 2B and 2C) confirm the electric and magnetic dipole-like scattering. At shorter wavelengths, many higher orders exist with multi-pole-like scattering.

By placing two rectangular dielectric resonators in close proximity such that their near fields overlap, a system of coupled resonators 18 is created that significantly changes the spectral positions and widths of the resonances. We can thus utilize the gap size and position as additional degrees of freedom to engineer the scattering amplitude and phase. Because of the lack of an analytical solution for coupled rectangular dielectric resonators, we rely on FDTD simulations to predict their optical response.

Figure 3:
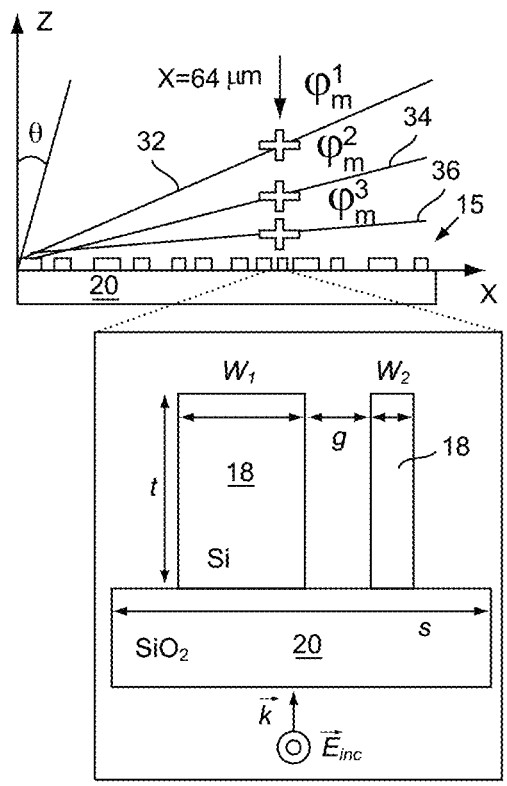
FIG. 3 includes a side view of the metasurface 15 designed for beam deflection, wherein a 240-μm long array of silicon rectangular dielectric resonators 18 is patterned on a fused silica substrate 20. The effect of the phase profile, φ$_m$, is to deflect normally incident transverse-electric (TE) polarized light to an angle, θ$_0$=−17° for λ$_1$=1300 nm, λ$_2$=1550 nm, and λ$_3$=1800 nm. The metasurface 15 is divided into 240 unit cells similar to the one shown in the inset.

An achromatic metasurface 15 can be designed by judiciously selecting an appropriate distribution of rectangular dielectric resonators. FIG. 3 shows the side view of the metasurface, wherein a 240 µm-long collection of silicon (Si) resonators patterned on a fused silica (SiO$_2$) substrate is designed to deflect normally incident light at an angle, θ=−17°, for three different wavelengths (i.e., $\lambda_1$=1300 nm, $\lambda_2$=1550 nm, and $\lambda_3$=1800 nm). The target wavelengths and spatially varying phase functions, represented by the three lines 32, 34, and 36, respectively for $\lambda_1$, $\lambda_2$, and $\lambda_3$ in FIG. 3 are defined by the following equations:

$$\varphi_m(x, \lambda_i) = -\frac{2\pi}{\lambda_i}\sin\theta_o x, \text{ for } I = 1, 2, 3. \quad (2)$$

We divide the metasurface into 240 slots with width, s=1 µm; and for each of them, we choose two rectangular dielectric resonators of fixed height, t=400 nm, and varying widths and separation, w$_1$, w$_2$ and g (as shown in FIG. 3), so that the phase response follows Equation 2. Each unit cell, made of a slot and two rectangular dielectric resonators, is different from each of the others; and, therefore, the metasurface 15 is completely aperiodic, unlike other blazed gradient metasurfaces.

Figure 4:
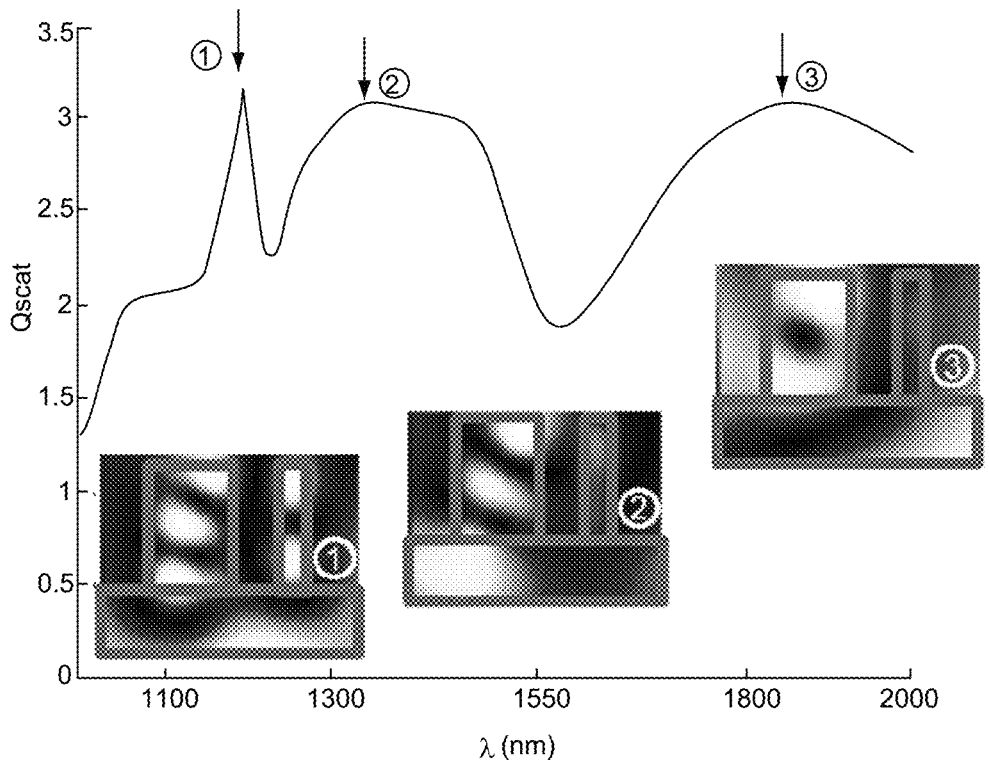
FIG. 4 plots the scattering efficiency for one unit cell of the metasurface of FIG. 3 with geometry, s=1 μm, t=400 nm, w$_1$=300 nm, w$_2$=100 nm, and g=175 nm. The spectrum shows resonances due to the individual elements and to the coupling between the resonators, as shown by the electric field intensity distributions.

To demonstrate the mechanism of light control at different wavelengths, consider the phase response required at one particular position of the beam deflector. From Equation 2, the target phase values for the unit cell centered at the position, x=64 µm for $\lambda_1$, $\lambda_2$ and $\lambda_3$, are calculated to be $\varphi_m^1$=142°, $\varphi_m^2$=25°, and $\varphi_p^6$=474°. FIG. 4 shows the scattering cross section of an isolated unit cell with geometry, w$_1$=300 nm, w$_2$=100 nm, and g=175 nm, excited with TE polarization. Considering a plane wave traveling along the z-axis and incident on the unit cell at a large distance from the interface (i.e., ρ>>λ), the field distribution is given by the following two contributions: the light diffracted by the subwavelength slot and the field scattered by the coupled resonators, as expressed in the following equation:

$$E(\rho) \approx \frac{e^{jk\rho}}{\rho}[a + b(\theta)], \quad (3)$$

where a is the diffraction amplitude proportional to the amount of incident field that does not interact with the resonators and is in phase with the incident light; θ is the angle between ρ and the z axis; and b(θ) is the complex scattering function.

Figure 5:
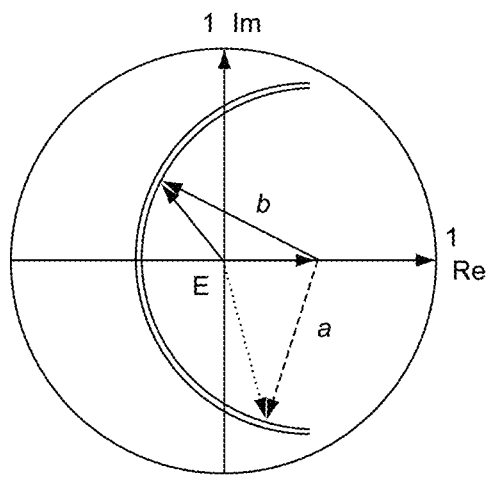
FIG. 5 is a vector representation of the interference between the electric fields scattered by the slot and by the two resonators, proportional to a and b, respectively. The phase of b associated with the resonant response can span the range (π/2, 3π/2), as indicated by the double-line. The vector sum of a (in green) and b is represented by the phasor, E (orange), for two different wavelengths (solid and dashed lines).

Equation 3 is valid in the limit of slot size, s, being significantly smaller than free-space wavelength, λ, which is not entirely applicable for our feature size; however, this approximation is sufficient to demonstrate the concept. The interference described by Equation 3 makes it possible to independently control the phase in the 0-2π range at several wavelengths simultaneously. This effect can be visualized using the complex field (phasors) representation of FIG. 5. While a is in phase with the incident field, the phase of b, associated with the scattered light due to the TE and TM resonances of the dielectric resonators, spans the range (π/2, 3π/2). The vector sum, E, can thus cover all four quadrants. Note that the scattering cross section, Q$_{scat}$, in FIG. 4 used to visualize the resonance of the structure is related to the forward scattering amplitude, b(o), by the optical theorem.

Figure 6:
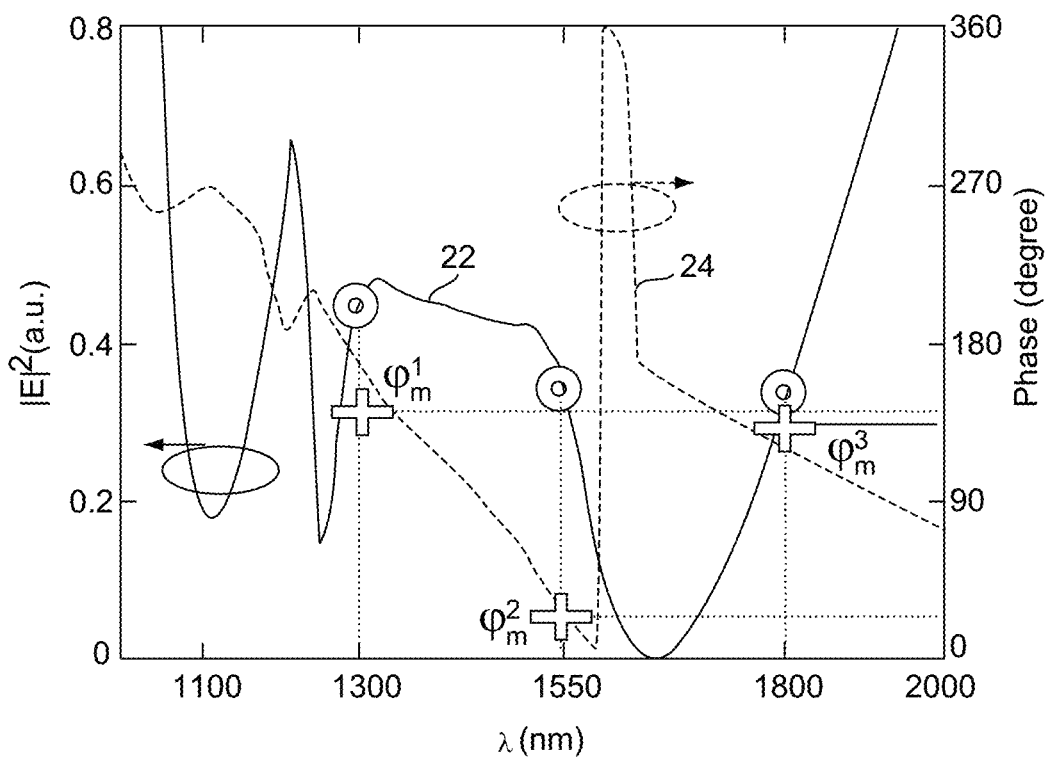
FIG. 6 plots the normalized intensity (solid line) 22 and phase (dashed line) 24 calculated at a distance of 10 cm away on the vertical axis to the interface for the same unit cell. The crosses represent the required phase values calculated from Equation 2 for λ$_1$, λ$_2$, and λ$_3$. The circles correspond to the scattered intensities for the same wavelengths.

FIG. 6 plots the normalized intensity (solid line) 22 and phase (dashed line) 24 calculated at a distance of 10 cm away on the vertical axis to the interface for the same unit cell and confirms that the coupled rectangular dielectric resonators shown in this example give a field with uniform transmitted intensity, |E|$^2$, at the three wavelengths of interest (i.e., the circles in FIG. 6) and phases, $\varphi_m^1$, $\varphi_m^2$, and $\varphi_m^3$, matching our design (i.e., the crosses in FIG. 6). When different unit cells composed of the two coupled resonators are placed close to each other, we expect the mutual coupling between neighboring resonators to partially modify the amplitude and phase response compared to the isolated cell. However, this interaction does not significantly compromise the overall response of the structure, as is shown below.

Experimental Realization of a Dispersion-Free Beam Deflector

FDTD simulations were performed to optimize the parameters, w$_1$, w$_2$, and g, for each unit cell in order to obtain the desired phase response, $\varphi_m$(x, λ), and a roughly uniform transmitted amplitude. We fix the unit cell width at s=1 µm, the height of the resonators 18 at t=400 nm, and the minimum value for w and g at 100 nm to keep the aspect ratio of the structure compatible with the fabrication process.

The algorithm utilized for the selection of the parameters of each unit cell is described in the Exemplification section, below.

Figure 7:
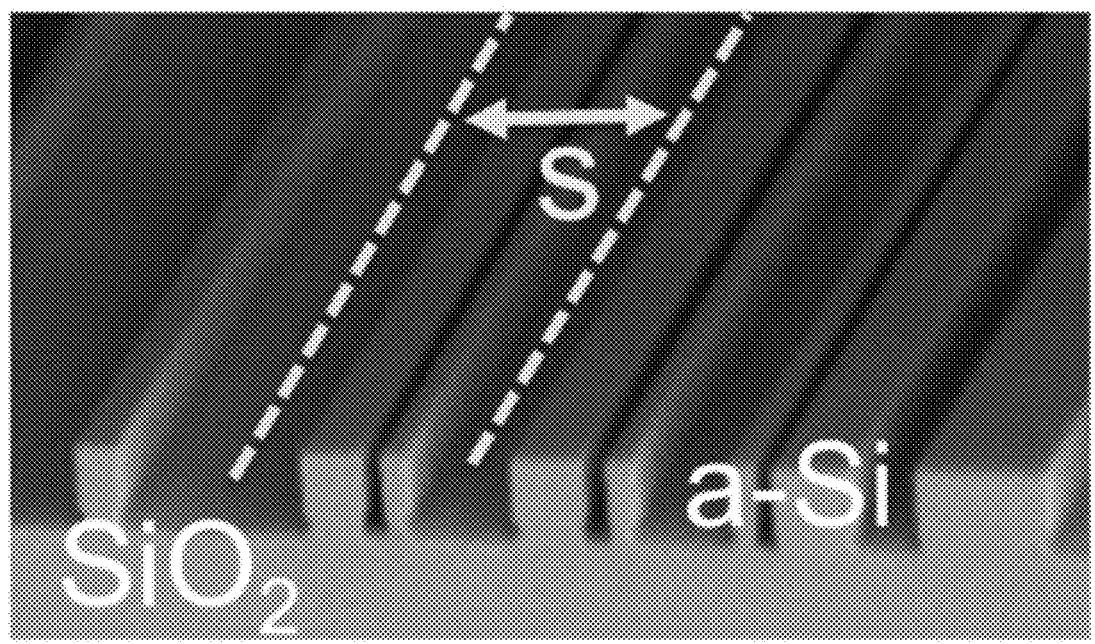
FIG. 7 is an SEM image of the cross section of the metasurface.
Figure 8:
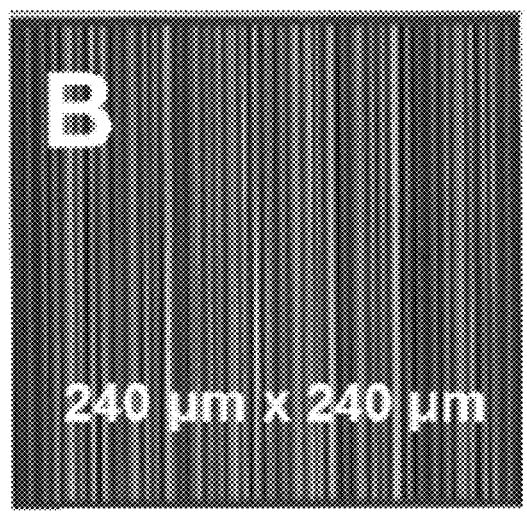
FIG. 8 is a photographic image of a 240 μm×240 μm section of the fabricated metasurface of FIG. 7 taken with an optical microscope.
Figure 9:
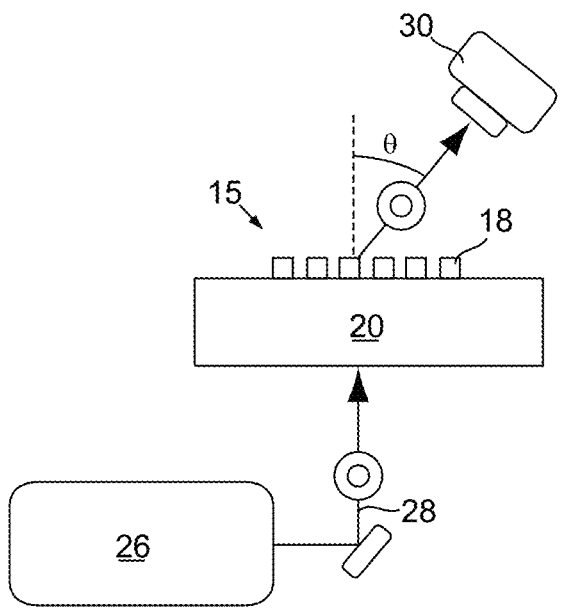
FIG. 9 is a schematic illustration of the experimental setup, including a tunable laser source 26 (that produces the incident light 28) and an InGasAs detector 30.
Figure 10:
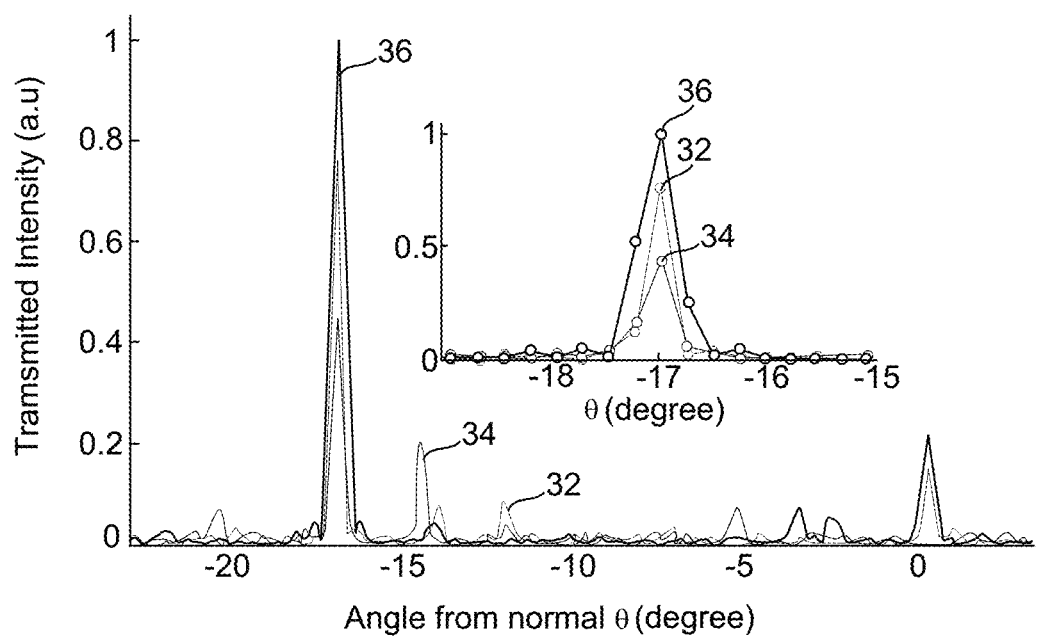
FIG. 10 plots the simulated far-field intensity as a function of the angle, θ, from the normal to the interface for λ$_1$=1300 nm 32, λ$_2$=1550 nm 34, and λ$_3$=1800 nm 36.
Figure 11:
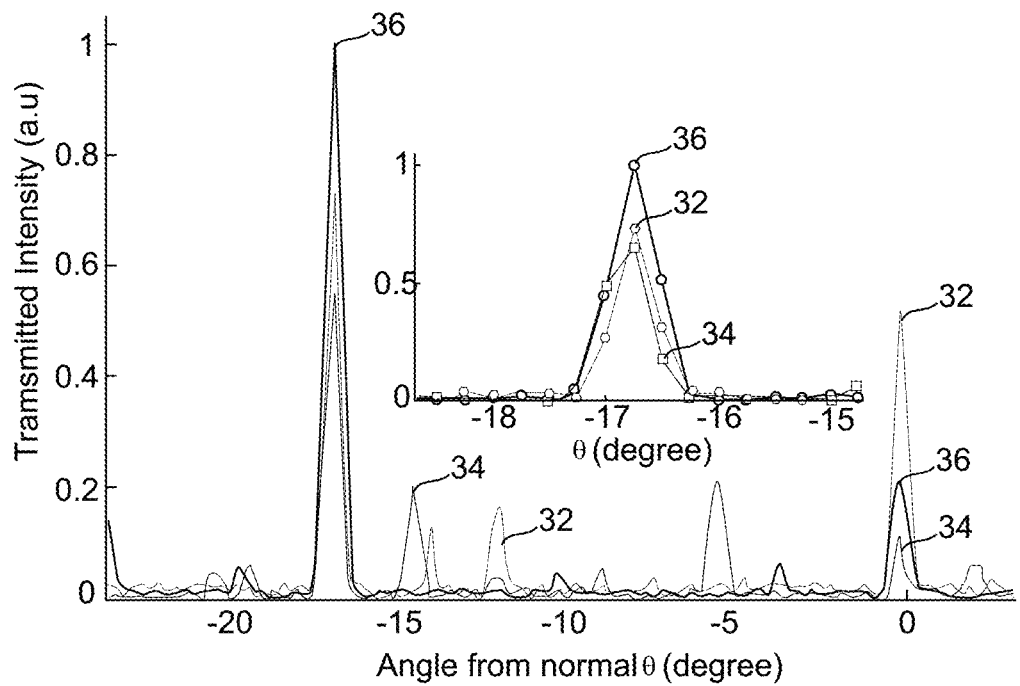
FIG. 11 plots the measured far-field intensity as a function of the angle, θ, from the normal to the interface. The intensity is normalized to the maximum value for the three wavelengths. The inset plot in FIG. 11 is close-up around the angle, θ0.

The fabrication procedure of the achromatic metasurface can involve chemical vapor deposition of amorphous silicon, electron-beam lithography, and reactive ion etching and is further described in the Exemplification section, below. FIGS. 7 and 8, respectively, show a scanning-electron-microscope (SEM) micrograph of several unit cells and an optical image of the entire fabricated metasurface. The experimental setup, represented in FIG. 9 and described in detail in the Exemplification section, below, allows measurement (by a detector 30) of the far field intensity distribution of the light 28 from the tunable laser source 26 after the light 28 is scattered by the metasurface 15 in the λ range from 1100 to 2000 nm. From the FDTD simulation of the entire structure, we calculate the far-field distribution of light transmitted through the interface at several wavelengths. Both the simulation (shown in FIG. 10) and the experimental results (FIG. 11), which plots the transmitted intensity across a range of angles for $\lambda_1=1300$ nm 32, $\lambda_2=1550$ nm 34 and $\lambda_3=1800$ nm 36, show the achromatic behavior of the metasurface 15. While the dispersive nature of any conventional flat/diffractive optical component would produce an angular separation of the three wavelengths, the angle of deflection at $\lambda_1=1300$ nm 32, $\lambda_2=1550$ nm 34, and $\lambda_3=1800$ nm 36 is the same, $\theta=-17°$. The diffraction order at the opposite side $(-\theta_0)$ is completely suppressed (see Exemplification section, below) confirming that the structure does not present any periodicity and that the steering effect is the result of the phase gradient introduced by the subwavelength resonators.

Figure 12:
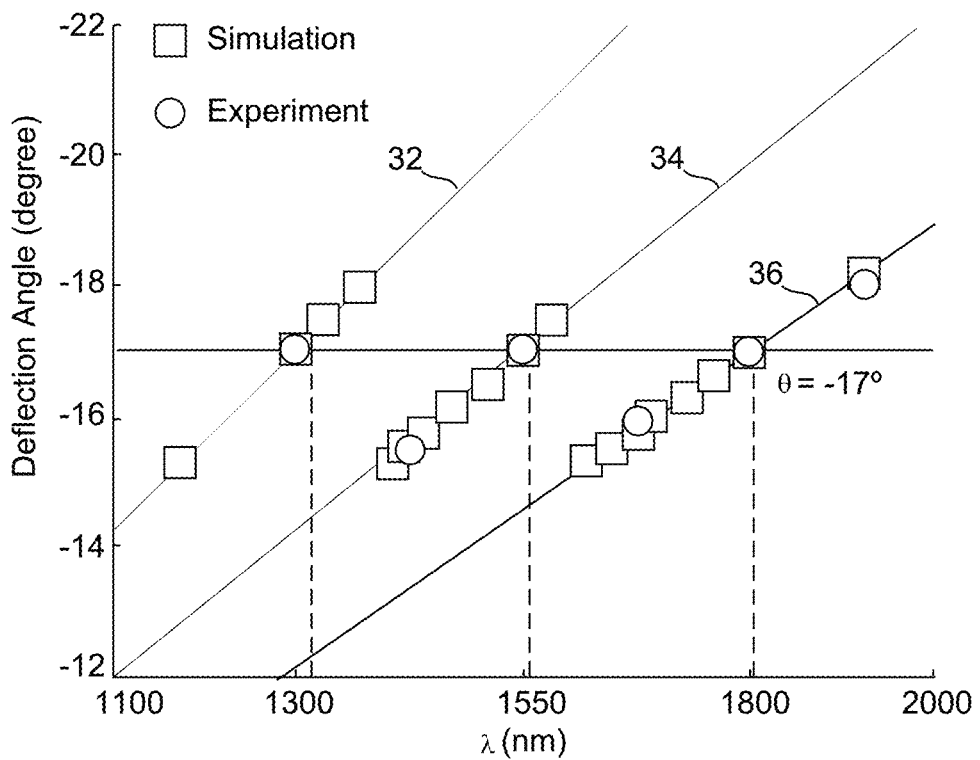
FIG. 12 plots experimentally measured deflection angles (circles) and simulated deflection angles (squares) for wavelengths from 1100 nm to 1950 nm. The curves correspond to the predicted deflection angle calculated from Equation 2 for fixed phase gradients designed for θ$_0$=−17° and λ=1300 nm 32, 1550 nm 34, and 1800 nm 36, respectively.

FIG. 12 summarizes the deflection angles for normal incidence simulated and measured in the entire spectral range from 1150 to 1950 nm. As expected, the device deflects the incident light at angle, $\theta_o$, only for the designed wavelengths. The three lines 32, 34, and 36 in FIG. 12 are the theoretical dispersion curves obtained from Equation 2 for metasurfaces designed for fixed wavelengths, $\lambda_1$, $\lambda_2$ and $\lambda_3$, respectively. The overlap of the experimental and simulated data with these curves indicates that wavelengths other than $\lambda_1$, $\lambda_2$ and $\lambda_3$ tend to follow the dispersion curve of the closest designed wavelengths. This result suggests that increasing the number of chromatically corrected wavelengths within a particular bandwidth is a viable path toward the creation of a truly broadband achromatic metasurface that operates over a continuous wavelength range.

Figure 13:
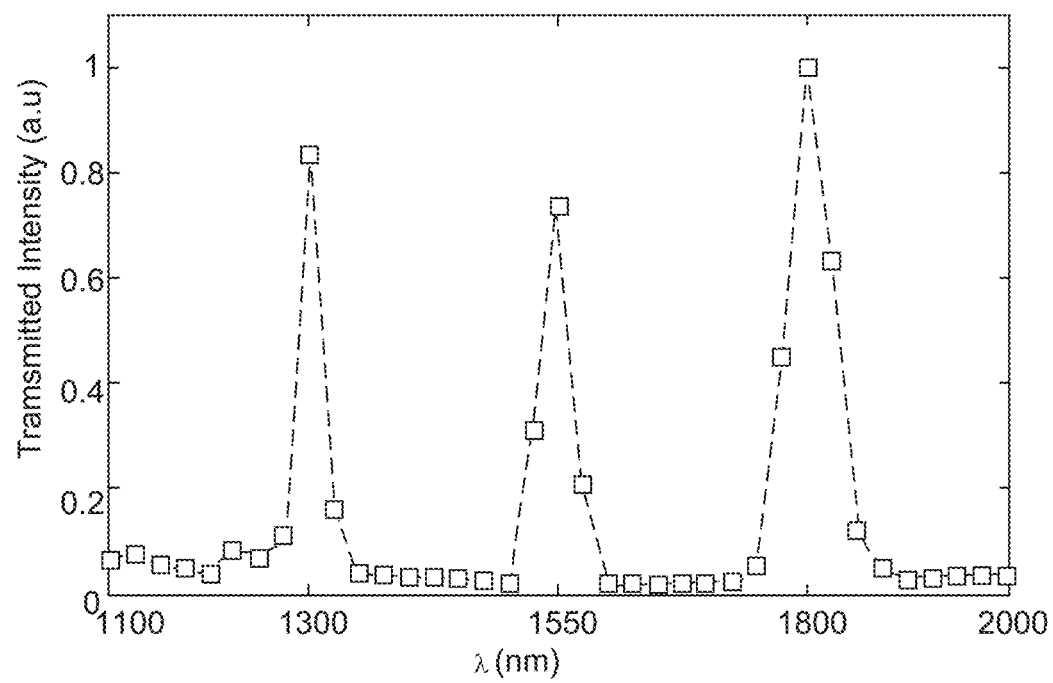
FIG. 13 plots the intensity measured by the detector at θ$_0$; the three peaks at the wavelengths, λ$_1$, λ$_2$ and λ$_3$, have similar intensities and a high suppression ratio (50:1) with respect to other wavelengths.

An advantageous objective for an achromatic optical device is uniform efficiency within the bandwidth. The intensity at the angular position, $\theta=-17°$, is measured as a function of the wavelength from 1100 nm to 2000 nm in FIG. 13. This result shows good uniformity of the intensity measured at $\lambda_1$, $\lambda_2$ and $\lambda_3$ (i.e., intensity variations are less than 13%) and large suppression ratios with respect to the other wavelengths (50:1). These properties suggest that this device can be used as an optical filter with multiple pass bands; the full-width at half-maximum for each band is about 30 nm (more details in the Exemplification section, below). Compared to conventional bandpass optical filters that often rely on thin film interference effects from multilayer stacks, a filter based on the achromatic metasurfaces described herein is much thinner and can be created in a single step of deposition, lithography, and etching.

The absolute efficiency of the device (total power at $\theta_0$ divided by the incident power) is also measured for the three wavelengths, which is 9.8%, 10.3% and 12.6% for $\lambda_1$, $\lambda_2$ and $\lambda_3$, respectively. From the analysis of the FDTD simulations, one can understand the origin of the limited efficiency and how to improve it. Optical losses are negligible, as expected, given the low absorption coefficient of silicon (Si) in the near infrared. For the three wavelengths of interest, the average transmitted power is about 40% of the incident power, while the remaining 60% is reflected. The transmitted power that is not directed to the desired angle of deflection goes into residual diffraction orders (note, for example, the intensity peak at $\theta=0°$ for $\lambda=1100$ nm in FIG. 11). This residual diffraction is mainly due to the imperfect realization of the phase function and non-uniform resonators' scattering amplitudes across the metasurface. We expect that a more advanced algorithm for the selection of the resonators' geometry {e.g., genetic algorithms [see D. E. Goldberg, Genetic Algorithms in Search, Optimization, and Machine Learning (Addison-Wesley, 1989)], particle swarm optimization [N. Jin, et al., "Advances in Particle Swarm Optimization for Antenna Designs: Real-Number, Binary, Single-Objective and Multiobjective Implementations," 55 IEEE Trans. Antenn. Propag. 556-557 (March 2007)], etc.}; optimization of the other parameters, s and t; or choice of a different type of resonator would yield a more accurate approximation of the target phase function, which could bring the efficiency of the device up to 40%. The large reflected component is a result of the strong directionality of the rectangular dielectric resonator scattering towards the half-plane with a higher refractive index.

Figure 2B:
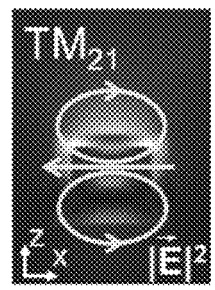
Figure 2C:
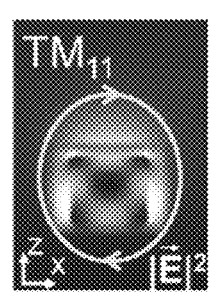

Using a low-index substrate 20 (e.g., porous silica or even an aerogel) would, therefore, increase the efficiency to almost 50%. Recently, a stack of three metasurfaces has been proposed to provide complete phase control and to eliminate the reflected power, leading to 100% transmission at a single wavelength. An alternative approach is based on the control of the spectral position of electric and magnetic dipole resonances in dielectric resonators 18 to achieve impedance matching. It has indeed been shown that when these two resonances have the exact same contribution to the scattering of a nanoparticle, the interference of the two scattering channels with the excitation produces perfect transmission and zero reflection. The multi-polar resonances observed in the rectangular dielectric resonators can be separated in electric- and magnetic-type of resonances depending on the distribution of the fields and the scattering properties (as shown in the images of FIGS. 2B and 2C). By designing dielectric resonators with multiple electric and magnetic resonances that overlap at the wavelengths of interests, multi-spectral control of the wavefront with high transmitted power can be achieved.

Note that, in general, the phase function is defined up to an arbitrary additive constant; therefore, Equation 1 can be generalized as follows:

$$\varphi_m(r, \lambda) = -\frac{2\pi}{\lambda} l(r) + C(\lambda). \qquad (4)$$

For linear optics applications, $C(\lambda)$ can take on any value and thus can be used as a free parameter in the optimization of the metasurface elements. More generally, $C(\lambda)$ can be an important design variable in the regime of nonlinear optics where the interaction between light of different wavelengths becomes significant.

Achromatic Flat Lens

As a final demonstration of achromatic metasurfaces, a flat lens design based on rectangular dielectric resonators for the same three wavelengths is presented. The same parameters, s and t, are used as were used in the previous demonstration; and the values of $w_1$, $w_2$ and g for 600 unit cells are chosen using a similar optimization code, where the target wavelength and spatially variant phase function is expressed as follows:

$$\varphi_m(x, \lambda_i) = -\frac{2\pi}{\lambda_i}\left(\sqrt{x^2 + f^2} - f\right) \text{ for } i = 1, 2, 3, \quad (5)$$

where the focal distance is f=7.5 mm.

Figures 14A, 14B, 14C, 14D:
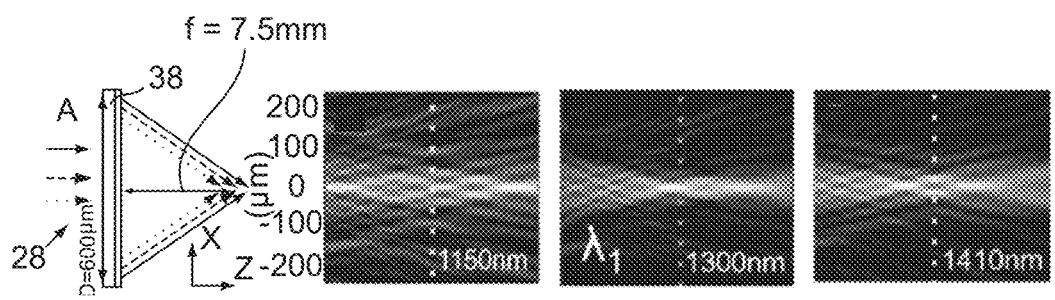
FIGS. 14A-H show the results of a simulation of an achromatic flat lens 38 based on rectangular dielectric resonators. The illustration of FIG. 14A shows a broadband plane wave 28 illuminating the backside of the cylindrical lens 38 with side, D=600 μm, and focal distance, f=7.5 mm. The images of FIGS. 14B-H show the far-field intensity distribution for different wavelengths. The dashed lines correspond to the desired focal planes.
Figures 14E, 14F, 14G, 14H:
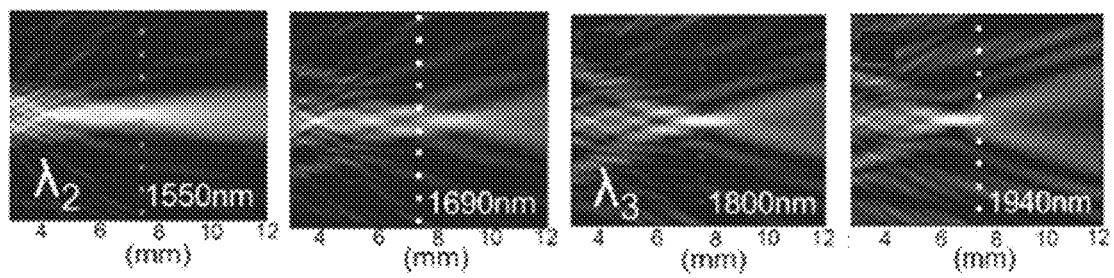
Figure 15:
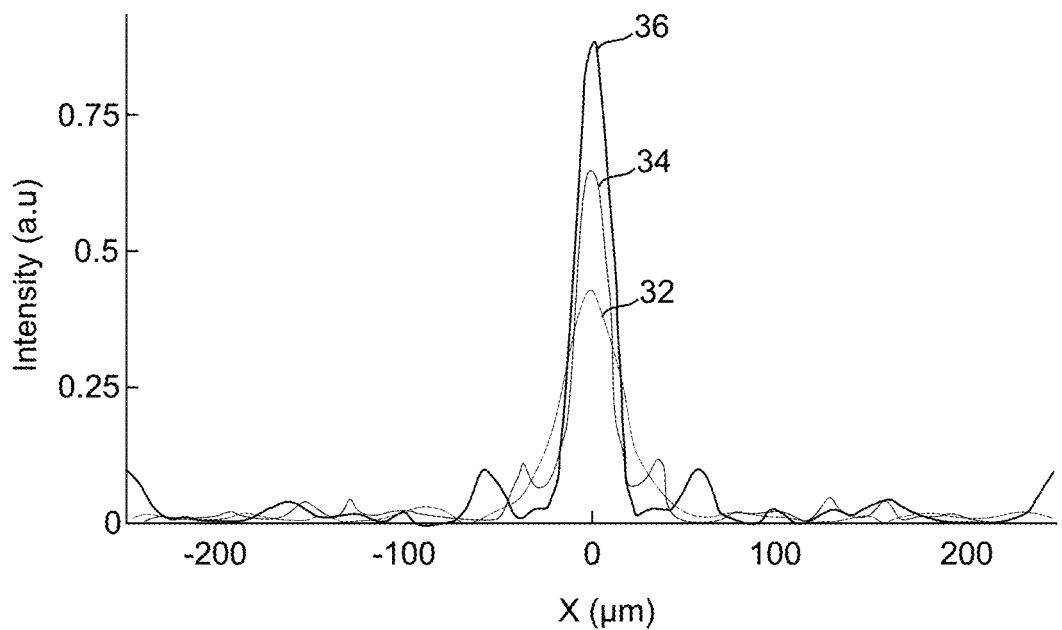
FIG. 15 plots the cross section across the focal plane of the intensity distribution for λ$_1$, λ$_2$, and λ$_3$ for the achromatic flat lens 38 of FIG. 14A with rectangular dielectric resonators.
Figure 16:
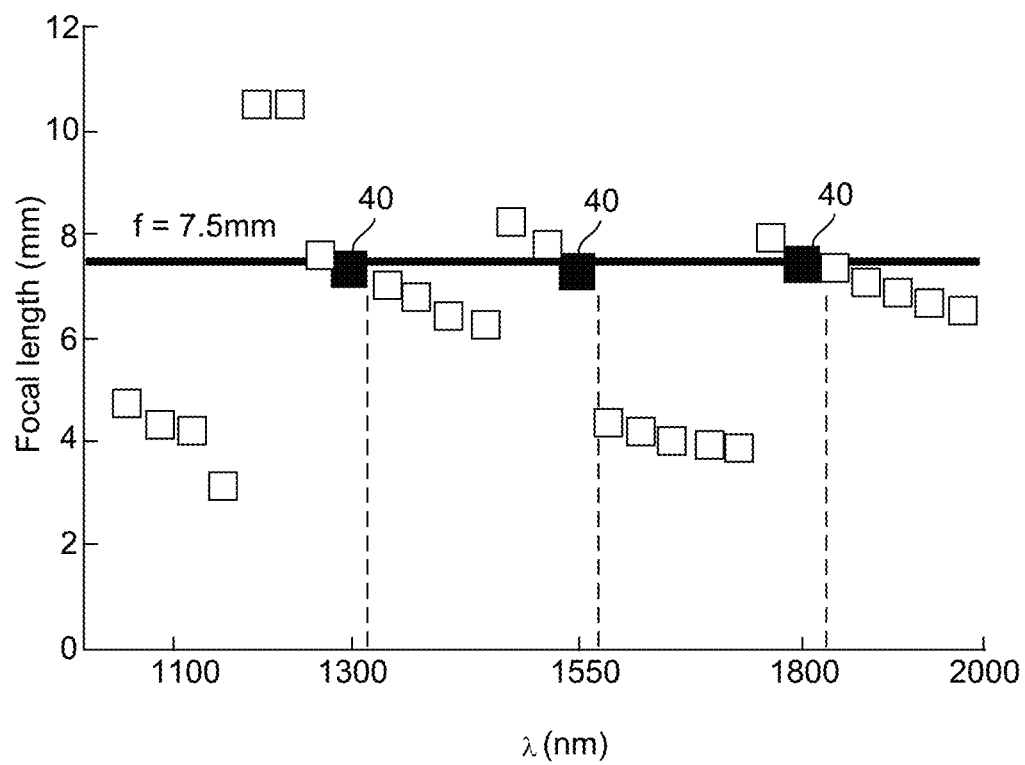
FIG. 16 plots the focal lengths as a function of wavelength, calculated as the distance between the lens center and highest intensity point on the optical axis, for the achromatic flat lens of FIG. 14A with rectangular dielectric resonators. The three larger markers 40 correspond to the wavelengths of interest.

Since two-dimensional rectangular dielectric resonators are being used, the hyperbolic phase gradient is applied only in one dimension, imitating a cylindrical lens. The achromatic properties of the lens are demonstrated with FDTD simulations, as shown in FIGS. 14B-H. Broadband light 28 from a light source (e.g., a laser, a light bulb, or the sun that transmits light through a polarizer that transmits light polarized along the axis of the rectangular dielectric resonator) illuminates the backside of the flat lens 38 at normal incidence (as shown in the illustration of FIG. 14A). The intensity distribution at different wavelengths shows the expected focusing at f=7.5 mm for $\lambda_1$, $\lambda_2$, and $\lambda_3$ (as shown in the images of FIGS. 14C, 14E and 14G) and aberrated focusing at other wavelengths (as shown in the images of FIGS. 14B, 14D, 14F, and 14H). The diameters of the Airy disks at the focal spots are 50, 66 and 59 μm $\lambda_1$, $\lambda_2$, and $\lambda_3$, respectively, achieving focusing close to the diffraction limit (40 μm, 47 μm, and 55 μm, for numerical aperture, NA=0.05) (as shown in the plot of FIG. 15). For the wavelengths close to $\lambda_1$, $\lambda_2$ and $\lambda_3$, the focal distance follows the dispersion curve associated with the closest controlled wavelength (as shown in as shown in the plot of FIG. 16). We note that a recent report [C. Saeidia, et al., "Wideband plasmonic focusing metasurfaces," Appl. Phys. Lett. 105, 053107 (2014)] pointed out that, in order to achieve broadband focusing, the phase shift distribution of a metasurface should satisfy a wavelength-dependent function, though a general approach to overcome this inherent dispersive effect was not provided therein.

Concluding Remarks

Metasurfaces 15 have significant potential as flat, thin and lightweight optical components that can combine several functionalities into a single device, making metasurfaces good candidates to augment conventional refractive or diffractive optics. The achromatic metasurface concept demonstrated here can solve one of the most critical limitations of flat optics (i.e., single wavelength operation).

After introducing the basic concept of dispersion-compensated phase, a planar beam deflector was demonstrated that is capable of steering light to the same direction at three different wavelengths and which can also be used as a single-layer multi-pass-band optical filter. Additionally, a design was presented for an achromatic flat lens 38 using the same metasurface 15 building blocks. In the visible realm, this kind of lens can find application in digital cameras where a red-green-blue (RGB) filter is used to create a color image. Holographic 3D displays require an RGB coherent wavefront to reconstruct a 3D scene. The use of achromatic flat optics for the collimation of the backlight may help maintain the flatness of such screens. Achromatic metasurfaces 15 for several discrete wavelengths can also be implemented in compact and integrated devices for second harmonic generation, four wave mixing [C. Jin, et al., "Waveforms for Optimal Sub-keV High-Order Harmonics with Synthesized Two- or Three-Color Laser Fields", 5 Nat. Comm. 4003 (30 May 2014)], and other nonlinear processes. The metasurface design described herein is scalable from the ultraviolet (UV) to the terahertz (THz) and beyond, and can be realized with conventional fabrication approaches (e.g., one step each of deposition, lithography, and etching). Finally, the versatility in the choice of the wavelength-dependent phase allows for functionalities that are very different (even opposite) from achromatic behavior. For example, an optical device with enhanced dispersion (e.g., a grating able to separate different colors further apart) can be useful for ultra-compact spectrometers.

Exemplification:

Fabrication of Achromatic Metasurfaces

A device was fabricated by depositing 400-nm amorphous silicon (a-Si) on a fused silica ($SiO_2$) substrate at 300° C. by plasma-enhanced chemical vapor deposition (PECVD). The rectangular dielectric resonators were defined by electron-beam lithography using the positive resist, ZEP-520A from ZEON Corp., diluted in Anisole with a ratio of 1:1; exposed to a dose of 300 μC/cm2 (500 pA, 125 kV); and developed for 50 see at room temperature in o-xylene. The silicon ridges were then obtained by dry etching using Bosch processing. At the end of the process, the residual resist layer was removed with a one-hour bath in MICROPOSIT Remover 1165 (from Rohm and Haas Electronic Material, LLC, of Marlborough, Massachusetts, US), rinsed in PG Remover (from MicroChem Corp. of Newton, Massachusetts, US) and exposed to 1 minute of $O_2$ plasma at 75 W. The sample used for the SEM image in FIG. 7 was sputter-coated with 5 nm of platinum/palladium to eliminate charging in the SEM.

Optical Properties of the Amorphous Silicon

Figure 17:
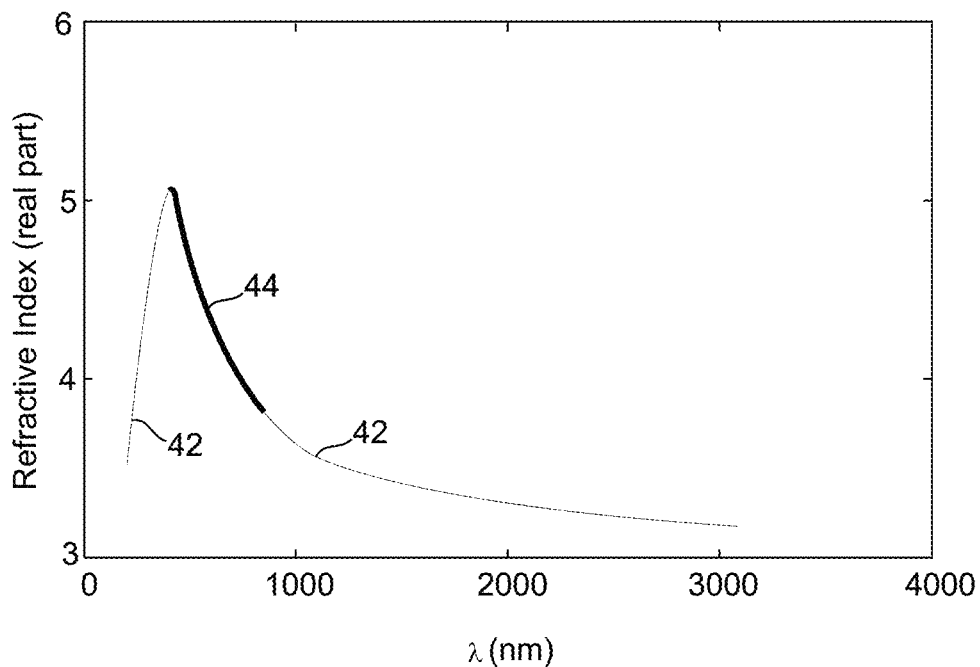
FIG. 17 plots an ellipsometric characterization of the 400-nm-thin a-Si film deposited with PECVD. The thinner curve 42 is obtained by fitting the experimental data 44 with the analytical model. The imaginary part of the refractive index is negligible at the wavelengths of interest (1100 nm-2000 nm).

The plot of FIG. 17 shows the experimental data 44 (and model fit 46) of the optical properties of the amorphous silicon layer in the wavelength range of 400 nm to 850 nm obtained with an Imaging Ellipsometer "nanofilm_ep4" performed by Accurion. The Cody-Lorentz dispersion model was used to extrapolate the refractive index into the near infrared. The values extracted were used for the numerical simulations.

Experimental Setup

The measurement set-up includes a supercontinuum laser (e.g., "SuperK" laser from NKT Photonics of Birkerød, Denmark) equipped with a set of acousto-optic tunable filters (NKT "Select" filters) to tune the emission from 1100 nm to 2000 nm with a line-width of 15 nm. The output of the laser is focused with a long focal distance lens (f=20 cm, not shown in FIG. 9) to guarantee uniform illumination of the 240 μm×240 μm metasurface. The intensity of the transmitted light as a function of the angle, θ, is recorded by using a broadband InGaAs detector (Thorlabs DET10D) mounted on a motorized rotation stage. In FIG. 12, the experimental data below λ=1300 nm are missing because of the low power of the source and low sensitivity of the detector below that wavelength. For the measurement of the efficiency, the detector is replaced by the head of a power meter (Ge photodiode sensor) with large active area. The efficiency values are normalized to the power incident on the back of the device.

Algorithm for the Optimization of the Unit-Cells

To implement a given functionality of the achromatic metasurface 15, a particular wavelength-dependent phase function (Equation 1) is realized by designing the scattering properties of unit cells consisting of coupled dielectric resonators 18.

We fix the unit cell width, s=1 μm; the height of the silicon resonators, t=400 nm; and the minimum value for w and g at 100 nm; and we run a cycle of FDTD simulations for different geometries to obtain the desired phase response, $\varphi_m(x, \lambda)$, and quasi-uniform transmitted amplitude. We swept the parameters, $w_1$, $w_2$, and g in the range from 100 nm to 950 nm with steps of 25 nm in all the possible combinations enforcing that the sum of $w_1$, $w_2$ and g did not exceed the size of the unit cell, s, and calculated the transmitted intensity and the phase at a distance of 10 cm away on the vertical to the interface. The phase response was calculated as the phase of the field at that point minus the phase accumulated by the light via propagation through the glass slab and the air above the unit cell. For each simulation, if the transmitted intensity is at least 35% of the total source power and the difference between the calculated phase at each wavelength and the target value for a specific unit cell is less than 60°, the set of parameters is saved for that specific unit cell. The root-mean-square error (RMSE) of the phase for the three wavelengths is also calculated and saved. Every time a new set of parameters passes the check-test for transmitted intensity and phase difference for a specific unit cell, the geometry corresponding to the minimum RMSE is retained.

For the design of the beam deflector demonstrated herein, the average RMSE of the phase among all the unit cells for the three wavelengths at the end of the optimization is about 30°. This causes an imperfect match with the design requirements that will somewhat reduce the performance of the device (i.e., residual diffraction orders and background).

Rectangular Dielectric Resonator Model

Figure 18:
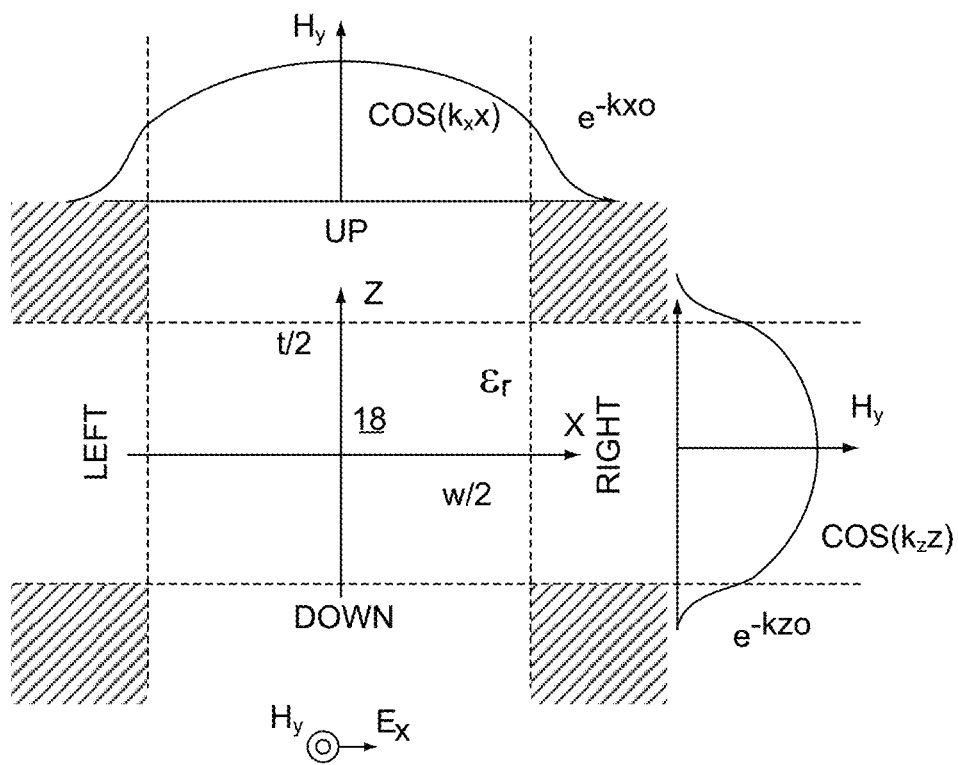
FIG. 18 shows the geometry and field distribution of a rectangular dielectric resonator 18.

A simple analytical expression based on a dielectric waveguide model (DWM) is derived to estimate the resonant frequencies of a rectangular dielectric resonator. According to this model, an isolated rectangular dielectric resonator is assumed to be a truncated section of an infinite dielectric waveguide, and the field pattern inside the resonator 18 is a standing wave along the x axis inside the dielectrics and decays exponentially outside (as shown in FIG. 18). If we truncate along the z axis, a standing wave pattern is setup along z, as well. The standing waves along x and z can be assumed to be governed by the same equations.

After writing the field components and imposing the boundary conditions, we can derive the transcendental equations from which the wave numbers, $k_x$ and $k_z$, corresponding to the resonant wavelengths can be calculated.

In FIG. 18, the TM modes are calculated by solving the Helmholtz equation, as follows:

$$\nabla^2 H_y + k_0 \varepsilon_r H_y = 0.$$

Assuming a harmonic field, the Ampere law provides the following:

$$\nabla \times H = \varepsilon_r \frac{\partial E}{\partial t} \rightarrow \begin{cases} E_x = \frac{j}{\omega \varepsilon_r} \frac{\partial H_y}{\partial z} \\ E_z = -\frac{j}{\omega \varepsilon_r} \frac{\partial H_y}{\partial x} \end{cases}.$$

Given the symmetry of the structure with respect to x=0, the expressions of the fields inside the resonator, and in the half-planes left (x>w/2), right (x<−w/2), up (z>t/2) and down (z<−t/2) are as follows:

$$-w/2 < x < -w/2 \text{ and } -t/2 < t < -t/2 : \begin{cases} H_y = A\cos(k_x x)\cos(k_z z) \\ E_x = -\frac{j}{\omega \varepsilon_r} A k_z \cos(k_x x)\sin(k_z z) \\ E_z = \frac{j}{\omega \varepsilon_r} A k_x \sin(k_x x)\cos(k_z z) \end{cases},$$

$$z > t/2; z < -t/2 : \begin{cases} H_y = B\cos(k_x x)e^{-k_{zo}(z-t/2)} \\ E_x = -\frac{j}{\omega} B k_{zo} \cos(k_x x)e^{-k_{zo}(z-t/2)} \\ E_z = \frac{j}{\omega} B k_x \sin(k_x x)e^{-k_{zo}(z-t/2)} \end{cases},$$

and $$x > w/2; x < -w/2 : \begin{cases} H_y = Ce^{-k_{xo}(x-w/2)}\cos(k_z x) \\ E_x = -\frac{j}{\omega} C k_z e^{-k_{xo}(x-w/2)}\sin(k_z z) \\ E_z = \frac{j}{\omega} C k_{xo} e^{-k_{xo}(x-w/2)}\cos(k_z x) \end{cases},$$

where A, B, and C are variables to be calculated. The boundary conditions at the edges of the rectangular dielectric resonator read as follows:

$$\begin{cases} E_{z,IN} = E_{z,L/R} & x = w/2 \\ E_{x,IN} = E_{x,U/D} & z = t/2 \\ \varepsilon_r E_{x,IN} = E_{x,L/R} & x = \frac{w}{2} \\ \varepsilon_r E_{z,IN} = E_{z,U/D} & z = t/2 \end{cases}.$$

Applying these conditions, finally, one obtains the following:

$$\begin{cases} A = k_{xo}\varepsilon_r, \quad C = k_x \sin(k_x w/2) \\ B = \frac{k_{xo} k_z}{k_{zo}} \sin(k_z t/2) \\ k_x w = m\pi - 2\tan^{-1}(k_x/\varepsilon_r k_{xo}) \\ k_z w = p\pi - 2\tan^{-1}(k_z/\varepsilon_r k_{zo}) \end{cases}. \quad (6)$$

Using the following expressions:

$$\begin{cases} k_x^2 + k_z^2 = \varepsilon_r k_o^2 \\ k_{xo} = \sqrt{(\varepsilon_r - 1)k_o^2 - k_x^2} \\ k_{zo} = \sqrt{(\varepsilon_r - 1)k_o^2 - k_z^2} \end{cases},$$

the last two equations of Equation 6 can be solved to give the wavevectors along the x and z axes, corresponding to the resonant modes.

For TE modes, the Helmholtz equation for the electric field is used; and, following a similar procedure, the following transcendental equations for the resonant wavevectors are obtained:

$$\begin{cases} k_x w = m\pi - 2\tan^{-1}(k_x/k_{xo}) \\ k_z w = p\pi - 2\tan^{-1}(k_z/k_{zo}) \end{cases}.$$

Figure 19:
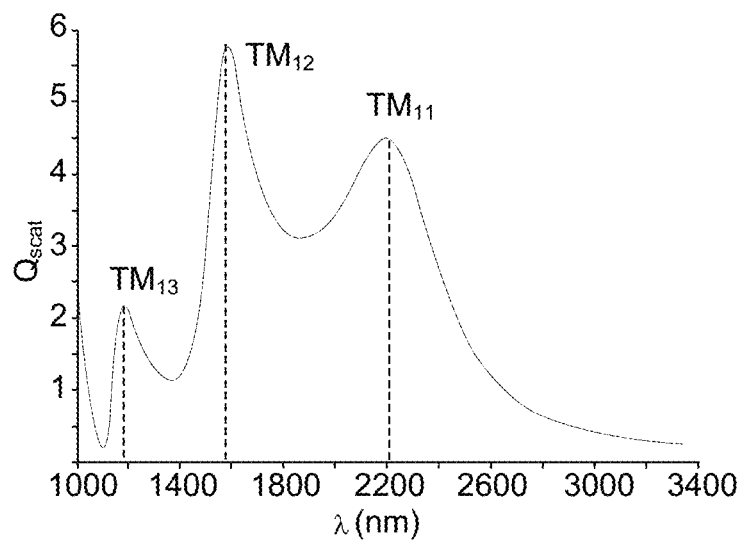
FIG. 19 charts the scattering cross section for a silicon rectangular dielectric resonator in vacuum with geometry, w=400 nm and t=500 nm, excited with TM polarization.
Figure 20:
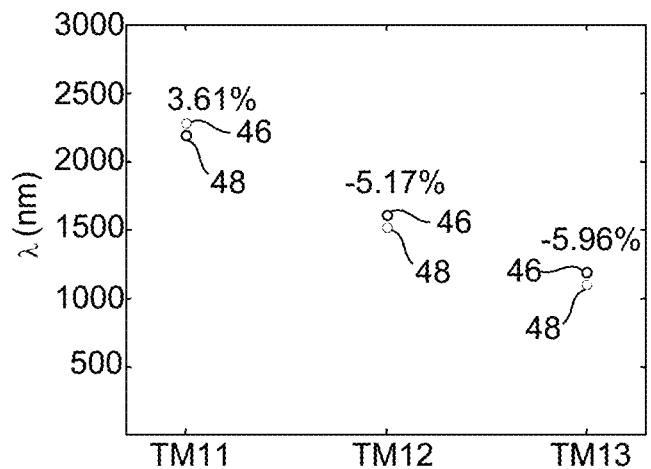
FIG. 20 charts a comparison between the theoretical model 46 and a FDTD simulation 48 of the resonant wavelengths for the first three modes (TM$_{11}$, TM$_{12}$, TM$_{13}$).
Figure 21:
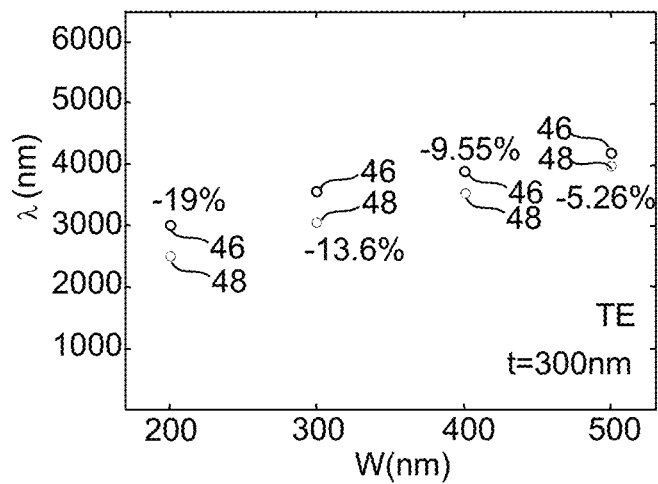
FIGS. 21 and 22 provide a comparison between the theoretical model and FDTD simulations of the resonant wavelengths for TE excitation for different widths, w, and for t=300 nm (FIG. 21) and t=500 nm (FIG. 22).
Figure 22:
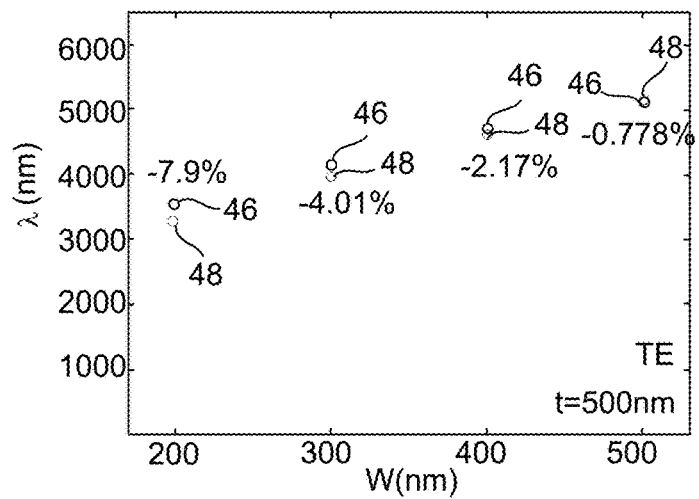
Figure 23:
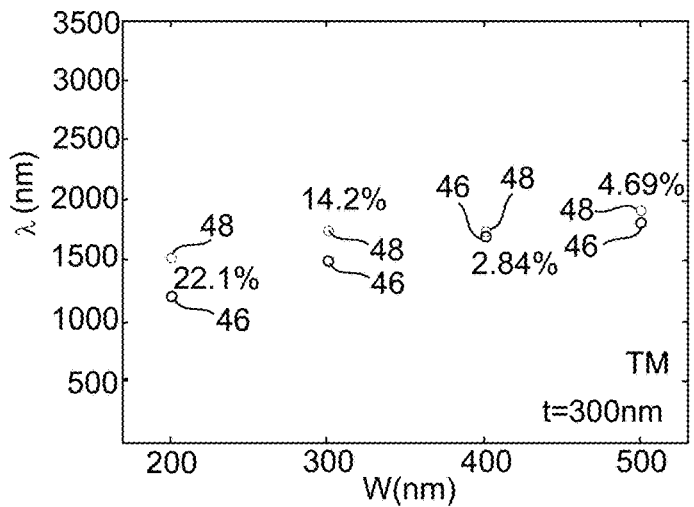
FIGS. 23 and 24 provide a comparison between the theoretical model and FDTD simulations of the resonant wavelengths for TM excitation for different widths, w, and for t=300 nm (FIG. 23) and t=500 nm (FIG. 24).
Figure 24:
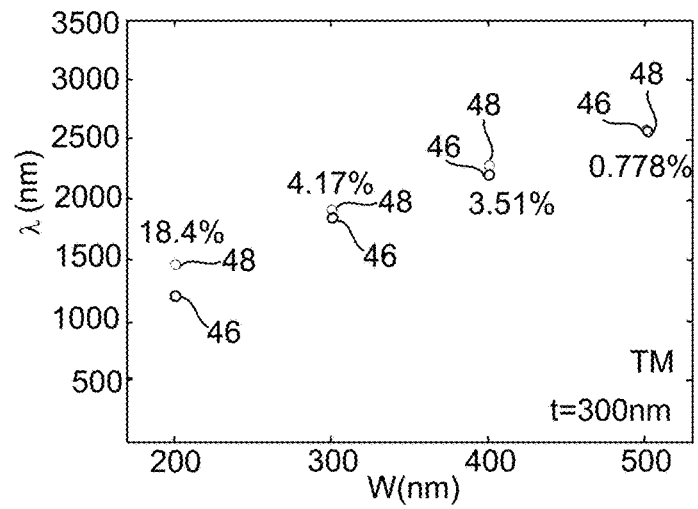

This model is useful to design a rectangular dielectric resonator because it helps us to predict the spectral positions of the resonant modes for a given geometry. The predictions of the model were validated by comparing the results with FDTD simulations. The scattering cross section of an isolated rectangular dielectric resonator 18 for TM excitation, such as the one in FIG. 2 with w=400 nm and t=500 nm, is simulated, allowing us to visualize the resonances in terms of the distribution of the electric and magnetic fields inside the resonator. In the range of wavelengths from 1000 nm to 3400 nm, the following resonant modes, $TM_{11}$, $TM_{12}$ and $TM_{13}$ are observed (as shown in FIG. 19). In FIG. 20, the resonant wavelengths in the FDTD simulation 48 are compared with those calculated from the theoretical model 46; the results are in close agreement, with an error of ±5% consistent with other works in the literature.

We also performed a comprehensive comparison of resonant wavelengths in the model 46 with resonant wavelengths in simulations 48 by calculating the first resonant mode for TE and TM excitation for different geometries of the rectangular dielectric resonator. The results are reported in FIGS. 21-24.

Far Field Measurement at $-\theta_0$

Figure 25:
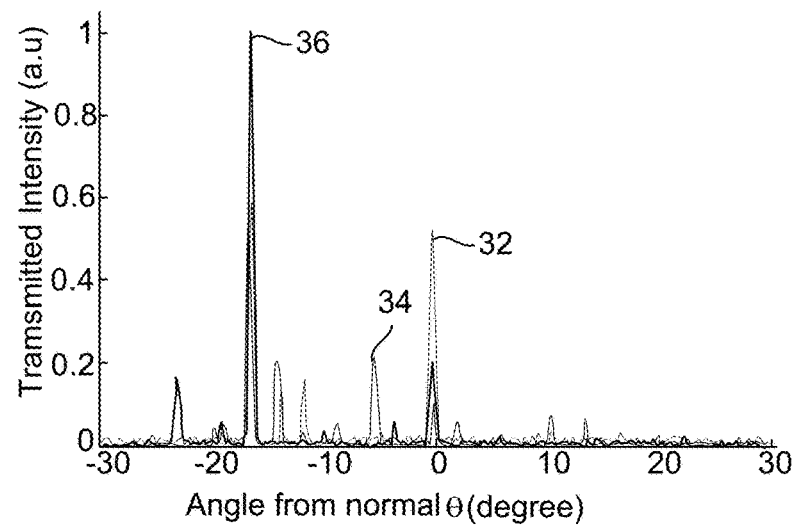
FIG. 25 plots the far-field measurement of the beam deflector for λ$_1$, λ$_2$ and λ$_3$. Since the structure does not present any periodicity, there is no peak in correspondence of the −1 order (θ=17°).

The achromatic beam deflector presented here does not feature any structural periodicity. While in previous works, a metasurface functionally equivalent to a blazed-grating was designed by repeating a single unit cell [see, e.g., N. Yu, et al., "Light Propagation with Phase Discontinuities: Generalized Laws of Reflection and Refraction," 334 *Science* 333-37 (2011); N. Yu, et al., "Flat optics: Controlling wavefronts with optical antenna metasurfaces," *IEEE J. Sel. Top. Quantum Electron.* 19(3), 4700423 (2013); N. Yu, et al., "Flat optics with designer metasurfaces," 13 *Nat. Materials* 139-150 (2014); and F. Aieta, et al., "Out-of-plane reflection and refraction of light by anisotropic optical antenna metasurfaces with phase discontinuities," 12 Nano Lett. 1702-1706 (27 Feb. 2012)], in the present case, all unit cells are different from each other because the three phase ramps necessary to deflect different wavelengths do not have any periodicity. Therefore, we expect complete suppression of any residual −1 diffraction order at the angular position, $-\theta_0$, that may rise from the imperfect phase or amplitude profile of the metasurface 15. This suppression is confirmed by looking at the measured far-field intensity distribution for the full range of angles, −30° to 30° (FIG. 25). Although we see some peaks outside the desired beaming angle (as discussed in the main text), no intensity peak is measured at 17°($-\theta_0$), confirming the absence of any residual effect due to periodicity.

Angle of Incidence Dependence

The metasurfaces 15 herein described are designed to work with light arriving at normal incidence. When the incoming beam arrives at a non-orthogonal angle, the symmetry of excitation of the unit cell is broken. As a consequence, other modes will be excited in the two-coupled-resonators system, affecting the phase and amplitude response. Under this condition, the device does not perform as an achromatic metasurface 15.

Figure 26:
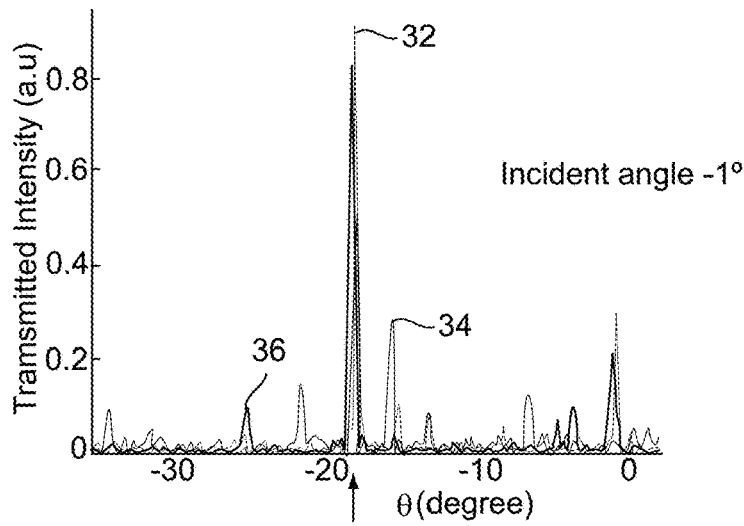
FIGS. 26-29 plot a FDTD simulation of the beam deflector performance for non-normal incidence, where the incoming beam forms an angle of −1° (FIG. 26), +1° (FIG. 27), −3° (FIG. 28) and +8° (FIG. 29) with respect to the normal. The orange arrows indicate the expected deflection angles for an achromatic metasurface.
Figure 27:
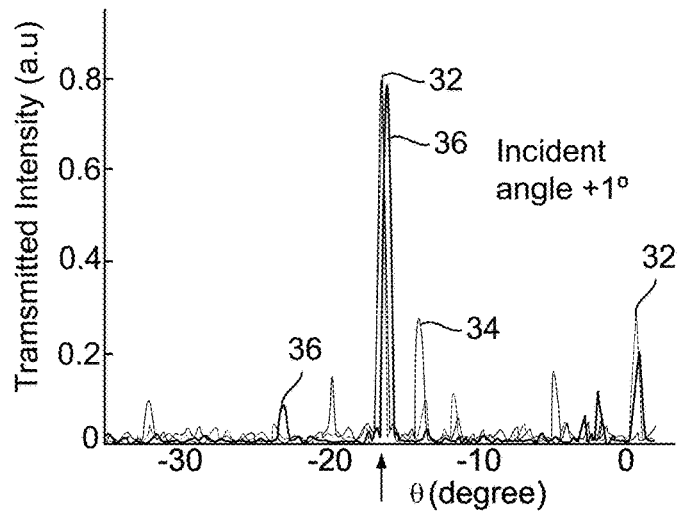
Figure 28:
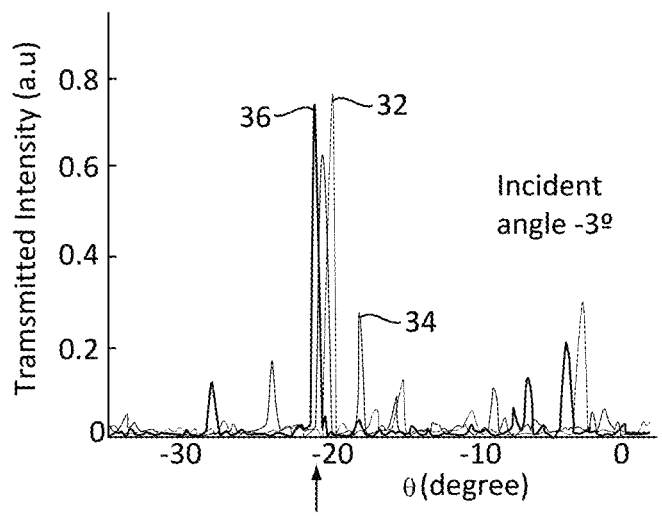
Figure 29:
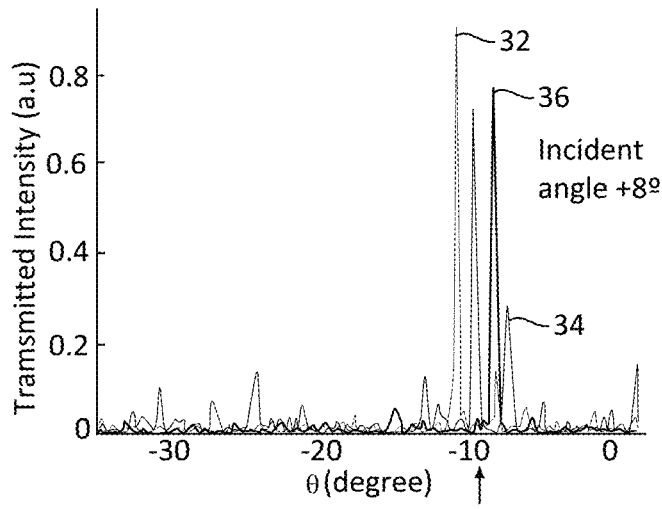

For angles of incidence in the range ±1°, achromatic deflection is preserved (see FIGS. 26 and 27). FIGS. 28 and 29 show the simulated far-field intensity distribution of the beam deflector for light incident from air at −3° and 8° angles with respect to the normal. In these cases, the angles of deflection are not constant for the three wavelengths and do not match the angles that we would expect if the phase gradients were those described in Equation 2. While, with the design used here, maintaining the desired phase and amplitude response for off-normal excitation is difficult, we expect that by reducing the thickness of the rectangular dielectric resonator or by choosing a different type of resonator (e.g., a plasmonic antenna), the effect of oblique illumination will have a smaller impact on the resonant response, enabling the achromatic operation for a wide range of angles of incidence.

Multiband Filter

Figure 30:
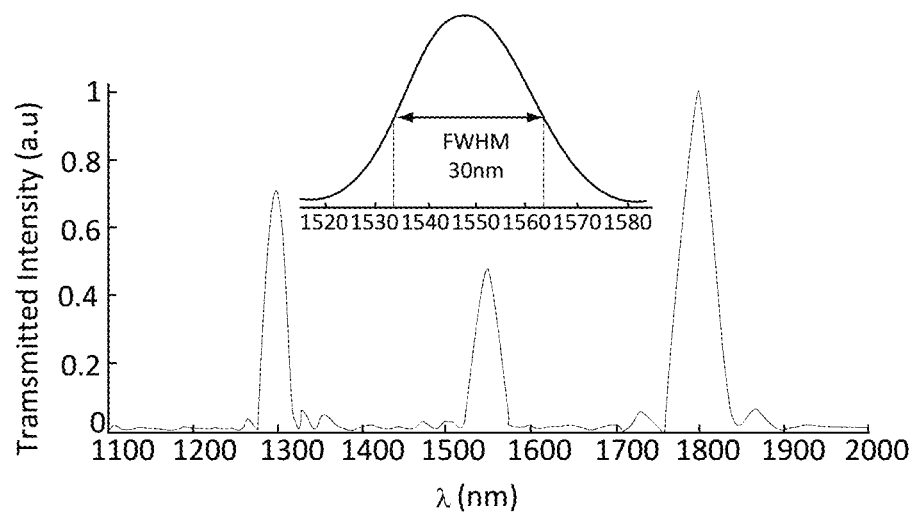
FIG. 30 plots the performance of the beam deflector as a multi-band filter, where a FDTD simulation confirms the uniformity and suppression ratio of the experimental data. The inset shows a close up of the peak corresponding to λ$_2$ from which we can estimate the FWHM bandwidth of the filter.

In the preceding text, we described how a multiband beam deflector can be used as an optical filter with multiple pass bands. Illuminating the metasurface with broadband light, only the light at $\lambda_1$, $\lambda_2$ and $\lambda_3$ will be directed to the desired angle, creating a spatial filter. FIG. 30 shows the FDTD simulation of the intensity monitored at the angle, θ=−17°, confirming the good intensity uniformity between $\lambda_1$, $\lambda_2$ and $\lambda_3$ and a high suppression ratio with respect to the other wavelengths, as seen in the experimental data. We can also estimate the bandwidth of the filter by looking at the full-width-half-maximum of the three peaks. As shown in the inset of FIG. 30 for the peak at $\lambda_2$, the FWHM is approximately 30 nm. By designing a more accurate phase function (as discussed in the preceding text), the FWHM of the multi-pass band filter can be reduced.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method of altering incident light using metasurface optical components, the method comprising:
   providing a substrate;
   depositing metasurface optical components on the surface of the substrate, wherein the metasurface optical components comprise a pattern of silicon dielectric resonators, the silicon dielectric resonators having nonperiodic gap distances between adjacent silicon dielectric resonators, and each silicon dielectric resonator has a width, a length, and a thickness; and
   directing incident light to the metasurface optical components, wherein the gap distances, the widths, and the thicknesses are configured to scatter the incident light and impart a phase shift, ranging at least from 0 to 2a, on an outgoing light,
   wherein each dielectric resonator has a rectangular cross-section in a plane perpendicular to the substrate surface such that a first phase shift is imparted for a transverse-electric (TE) component of the incident light and a second phase shift is imparted for a transverse-magnetic (TM) component of the incident light.

2. The method of claim 1, wherein the incident light comprises a wavelength of about 850 nm to 2000 nm.

3. The method of claim 1, wherein the incident light comprises a wavelength of about 100 nm to 1950 nm.

4. The method of claim 1, wherein the silicon dielectric resonators comprise amorphous silicon.

5. The method of claim 1, wherein each of the dielectric resonators have a width of at least 100 nm.

6. The method of claim 1, wherein the substrate comprises silica.

7. The method of claim 1, wherein the gap between the dielectric resonators comprises a material with a refractive index lower than the refractive index of the dielectric pillars.

8. The method of claim 1, wherein the widths of the dielectric resonators and the gaps between adjacent dielectric resonators are configured to deflect a plurality of wavelengths of interest at a shared angle.

9. The method optical device of claim 8, wherein the first and second phase shifts are different.

10. The method of claim 1, wherein the nonperiodic gaps are set such that each dielectric resonator is coupled to at least one adjacent dielectric resonator; and the nonperiodic gap size and position define the scattering amplitude and phase.

11. The method of claim 1, wherein the widths of the dielectric resonators and the gaps between adjacent dielectric resonators are configured to deflect a plurality of wavelengths of interest to or from a focal point at a shared focal length.

12. The method of claim 1, wherein the widths of the dielectric resonators and the gaps between adjacent dielectric resonators are configured to form a same complex wave-front for a plurality of wavelengths of interest.

13. A metasurface optical device, comprising:
   a substrate including a surface; and
   a pattern of silicon dielectric resonators on the surface of the substrate,
   wherein the silicon dielectric resonators have nonperiodic gap distances between adjacent silicon dielectric resonators, and each silicon dielectric resonator has a width, a length, and a thickness,
   wherein the gap distances, the widths, and the thicknesses are configured to scatter incident light and impart a phase shift, ranging at least from 0 to $2\pi$, on an outgoing light, and
   wherein each dielectric resonator has a rectangular cross-section in a plane perpendicular to the substrate surface such that a first phase shift is imparted for a transverse-electric (TE) component of the incident light and a second phase shift is imparted for a transverse-magnetic (TM) component of the incident light.

14. The metasurface optical device of claim 13, wherein the incident light comprises a wavelength of about 850 nm to 2000 nm.

15. The metasurface optical device of claim 13, wherein the incident light comprises a wavelength of about 1100 nm to 1950 nm.

16. The metasurface optical device of claim 13, wherein the silicon dielectric resonators comprise amorphous silicon.

17. The metasurface optical device of claim 13, wherein each of the dielectric resonators have a width of at least 100 nm.

18. The metasurface optical device of claim 13, wherein the substrate comprises silica.

19. The metasurface optical device of claim 13, wherein the gap between the dielectric resonators comprises a material with a refractive index lower than the refractive index of the dielectric pillars.

20. The metasurface optical device of claim 13, wherein the first and second phase shifts are different.

21. The metasurface optical device of claim 13, wherein the nonperiodic gaps are set such that each dielectric resonator is coupled to at least one adjacent dielectric resonator; and the nonperiodic gap size and position define the scattering amplitude and phase.

22. The metasurface optical device of claim 13, wherein the widths of the dielectric resonators and the gaps between adjacent dielectric resonators are configured to deflect a plurality of wavelengths of interest to or from a focal point at a shared focal length.

23. The metasurface optical device of claim 13, wherein the widths of the dielectric resonators and the gaps between adjacent dielectric resonators are configured to deflect a plurality of wavelengths of interest at a shared angle.

24. The metasurface optical device of claim 13, wherein the widths of the dielectric resonators and the gaps between adjacent dielectric resonators are configured to form a same complex wave-front for a plurality of wavelengths of interest.

* * * * *

UNITED STATES PATENT AND TRADEMARK OFFICE
CERTIFICATE OF CORRECTION

PATENT NO. : 12,025,812 B2
APPLICATION NO. : 18/220764
DATED : July 2, 2024
INVENTOR(S) : Aieta et al.

It is certified that error appears in the above-identified patent and that said Letters Patent is hereby corrected as shown below:

In the Claims

Column 19, Line 16 In Claim 1, replace "2a" with --$2\pi$--.

Column 19, Line 27 In Claim 3, replace "100 nm" with --1100 nm--.

Signed and Sealed this
Thirteenth Day of August, 2024

Katherine Kelly Vidal
*Director of the United States Patent and Trademark Office*